United States Patent
Yoshida

(10) Patent No.: US 9,451,208 B2
(45) Date of Patent: Sep. 20, 2016

(54) COMMUNICATION TERMINAL, COMMUNICATION SYSTEM, AND COMMUNICATION METHOD

(71) Applicant: Kumiko Yoshida, Tokyo (JP)

(72) Inventor: Kumiko Yoshida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/307,800

(22) Filed: Jun. 18, 2014

(65) Prior Publication Data
US 2014/0375750 A1    Dec. 25, 2014

(30) Foreign Application Priority Data

Jun. 25, 2013  (JP) .................................. 2013-132482

(51) Int. Cl.
| | |
|---|---|
| *H04N 7/14* | (2006.01) |
| *H04L 29/08* | (2006.01) |
| *G06F 21/62* | (2013.01) |
| *H04M 3/56* | (2006.01) |
| *H04M 7/00* | (2006.01) |
| *H04L 12/18* | (2006.01) |
| *H04L 29/06* | (2006.01) |

(52) U.S. Cl.
CPC .......... *H04N 7/141* (2013.01); *G06F 21/6245* (2013.01); *H04L 12/1831* (2013.01); *H04L 67/306* (2013.01); *H04M 3/567* (2013.01); *H04M 7/0027* (2013.01); *H04L 65/403* (2013.01)

(58) Field of Classification Search
USPC ....... 709/201, 202, 203, 212, 213, 216, 217; 348/14.01, 14.02, 14.07, 14.1, 130, 348/211.6, 231.2, 231.3, E7.081
See application file for complete search history.

(56) References Cited

U.S. PATENT DOCUMENTS

| | | | |
|---|---|---|---|
| 7,991,829 B2 * | 8/2011 | Takano ............... | H04L 12/1818 235/375 |
| 2004/0054630 A1* | 3/2004 | Ginter et al. .................. | 705/53 |
| 2014/0033067 A1* | 1/2014 | Pittenger ............... | G06F 21/606 715/751 |

FOREIGN PATENT DOCUMENTS

| | | |
|---|---|---|
| JP | 2007-323285 | 12/2007 |
| JP | 2012-118751 | 6/2012 |

OTHER PUBLICATIONS

U.S. Appl. No. 14/136,027, filed Dec. 20, 2013.

* cited by examiner

*Primary Examiner* — Yosef K Laekemariam
(74) *Attorney, Agent, or Firm* — Oblon, McClelland, Maier & Neustadt, L.L.P.

(57) ABSTRACT

A communication terminal which communicates with a different communication terminal via a communication network is disclosed. The communication terminal includes a display control unit which displays image data imaged by the different communication terminal on a display unit; and an image data storage unit which stores the image data displayed on the display unit in a capture storage unit when information indicating a permission to store is received from the different communication terminal.

10 Claims, 26 Drawing Sheets

FIG.8

RELAY APPARATUS MANAGEMENT TABLE

| RELAY APPARATUS ID | OPERATING STATUS | RECEIVED DATE/TIME | IP ADDRESS OF RELAY APPARATUS | MAXIMUM DATA TRANSMISSION SPEED (Mbps) |
|---|---|---|---|---|
| 111a | ON-LINE | 2013.02.10.13:42 | 1.2.1.2 | 100 |
| 111b | ON-LINE | 2013.02.11.12:05 | 1.2.2.2 | 1000 |
| 111c | OFFLINE | 2013.02.10.17:33 | 1.3.1.2 | 100 |
| 111d | ON-LINE | 2013.02.10.09:02 | 1.3.2.2 | 10 |

FIG.9

TERMINAL AUTHENTICATION MANAGEMENT TABLE

| TERMINAL ID | PASSWORD |
|---|---|
| 01aa | aaaa |
| 01ab | abab |
| 01ba | acac |
| ... | ... |

FIG.10

TERMINAL STATUS MANAGEMENT TABLE

| TERMINAL ID | TYPE | TERMINAL NAME | OPERATING STATUS | RECEIVED DATE/TIME | IP ADDRESS |
|---|---|---|---|---|---|
| 01aa | CALL TERMINAL | Japan Tokyo Office Terminal AA | ON-LINE (CALL POSSIBLE) | 2013.02.10.13:40 | 1.2.1.3 |
| 01ab | CALL TERMINAL | Japan Tokyo Office Terminal AB | ON-LINE (TEMPORARILY SUSPENDED) | 2013.02.11.12:00 | 1.2.1.4 |
| 02aa | PRINTING TERMINAL | Japan Tokyo Office Terminal AC | OFFLINE | 2013.02.09.17:30 | 1.2.1.5 |
| ... | ... | ... | ... | ... | ... |
| 01da | CALL TERMINAL | US Washington D.C Office Terminal DA | ON-LINE (CALL POSSIBLE) | 2013.12.10.12:41 | 1.3.2.3 |
| 01db | CALL TERMINAL | US Washington D.C Office Terminal DB | ON-LINE (CALL ONGOING) | 2013.02.10.13:30 | 1.3.2.4 |
| 02da | PRINTING TERMINAL | US Washington D.C Office Terminal DC | OFFLINE | 2013.02.10.09:00 | 1.3.2.5 |
| ... | ... | ... | ... | ... | ... |

FIG.11

DESTINATION LIST MANAGEMENT TABLE

| REQUESTOR TERMINAL ID | DESTINATION TERMINAL ID |
|---|---|
| 01aa | 01ab,···,01ba,01bb,···,01ca,01cb,01da,02aa,02da |
| ... | ... |
| 01ba | 01aa,01ab,01ca,01cb,01da,01db |
| ... | ... |
| 01ca | 01aa,01ab,01ba,···,01da,01ca,···,01da |
| ... | ... |

FIG.12

SESSION MANAGEMENT TABLE

| RELAY APPARATUS ID | REQUESTOR TERMINAL ID | DESTINATION TERMINAL ID | DELAY TIME (ms) | DELAY INFORMATION RECEIVED DATE/TIME |
|---|---|---|---|---|
| 111a | 01aa | 01da | 200 | 2013.02.10.13:50 |
| 111b | 01ba | 01cb | 50 | 2013.02.11.12:05 |
| 111c | 01bb | 01cc | 400 | 2013.02.10.17:35 |
| ... | ... | ... | ... | ... |

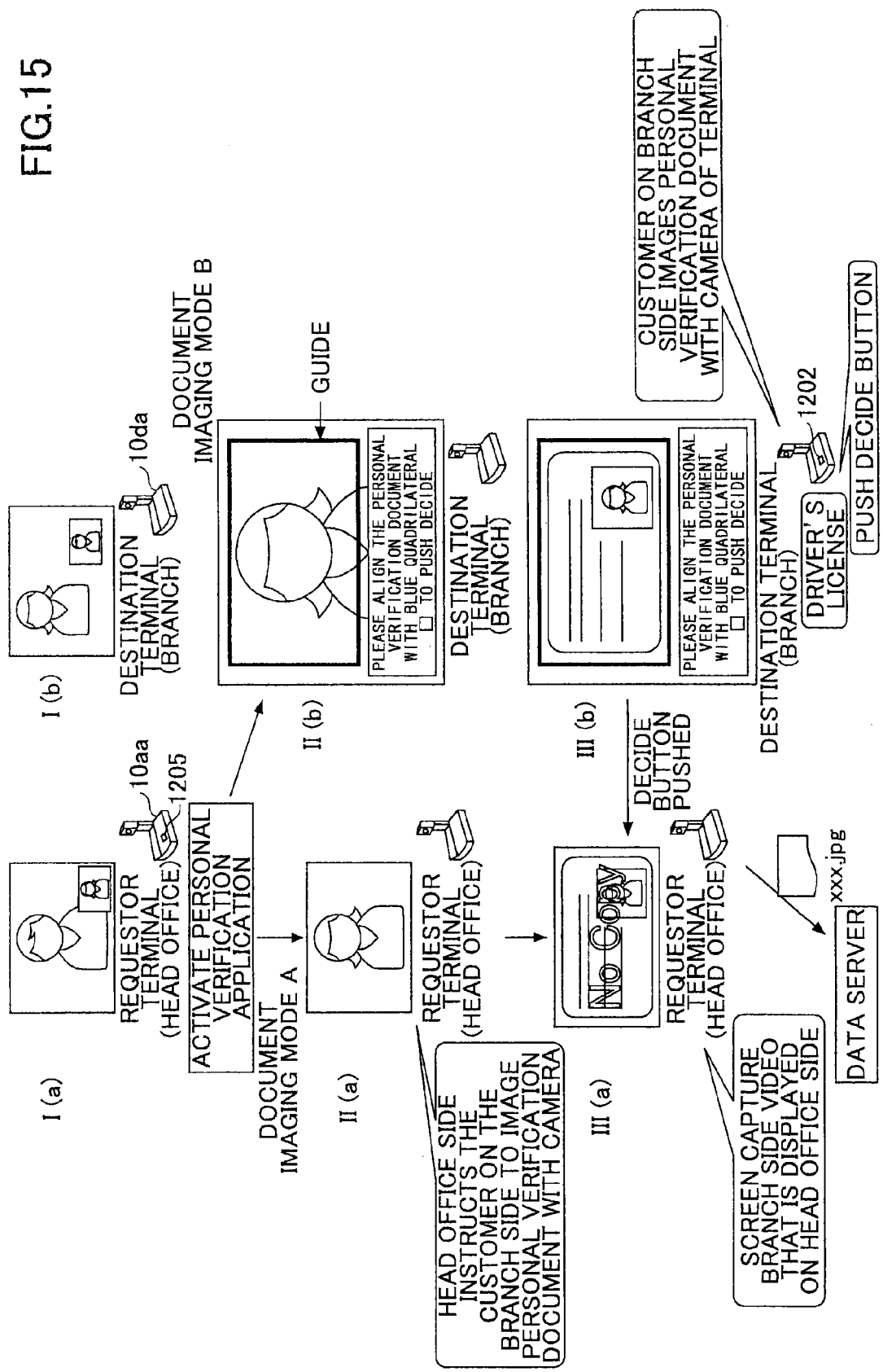

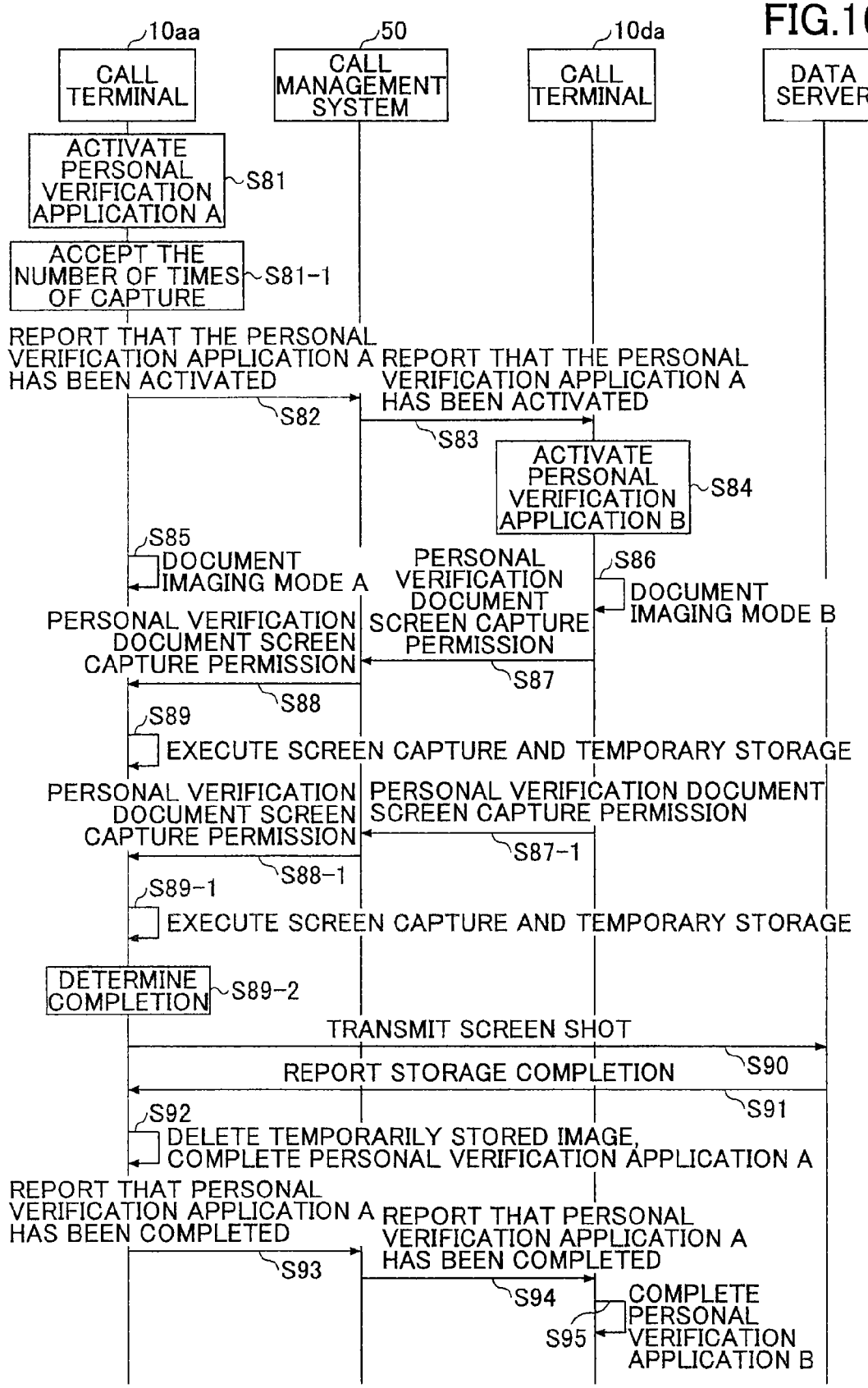

FIG.18

| AREA | TERMINAL ID |
|------|-------------|
| A21  | 01da        |
| A22  | 01db        |
| A23  | 01ca        |
| A24  | 01aa (OWN TERMINAL) |

FIG.20
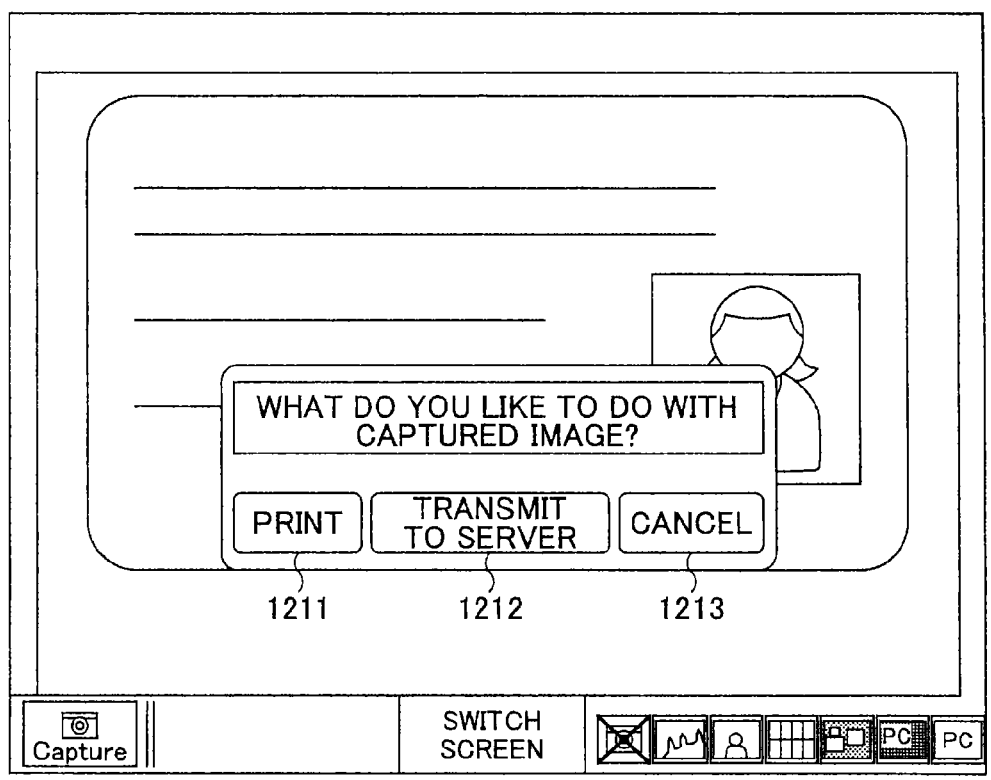
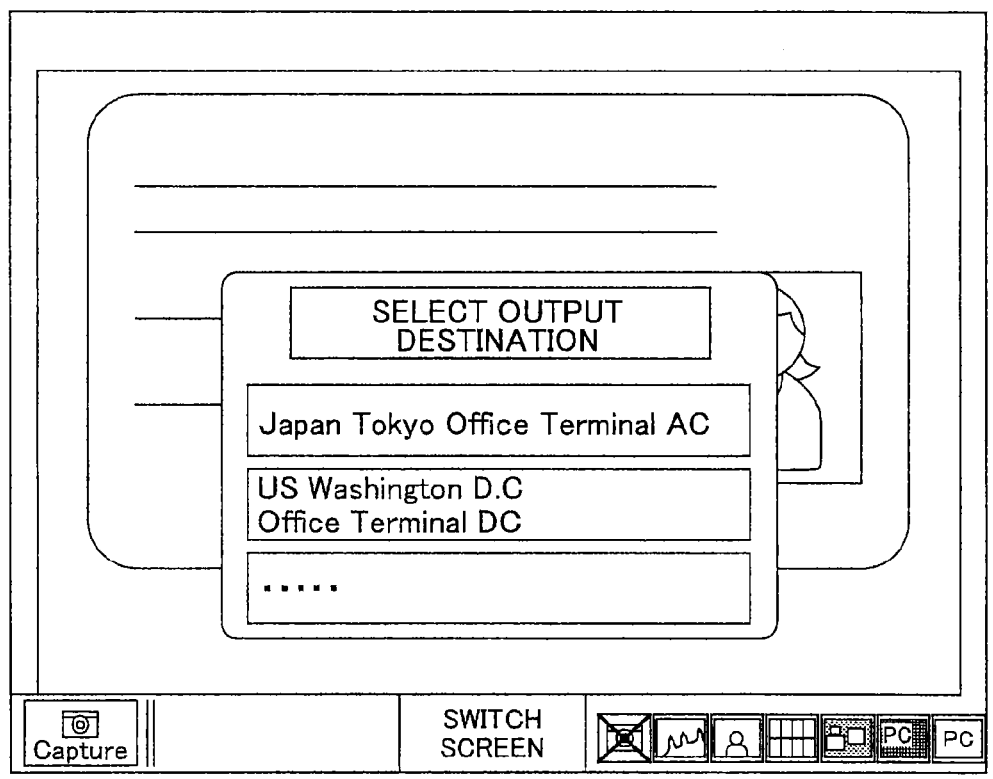

| TERMINAL ID | TYPE | TERMINAL NAME | OPERATING STATUS | IP ADDRESS |
|---|---|---|---|---|
| 02aa | PRINTING TERMINAL | Japan Tokyo Office Terminal AC | OFFLINE | 1.2.1.5 |
| 02da | PRINTING TERMINAL | US Washington D.C Terminal DC | ON-LINE | 1.3.2.5 |

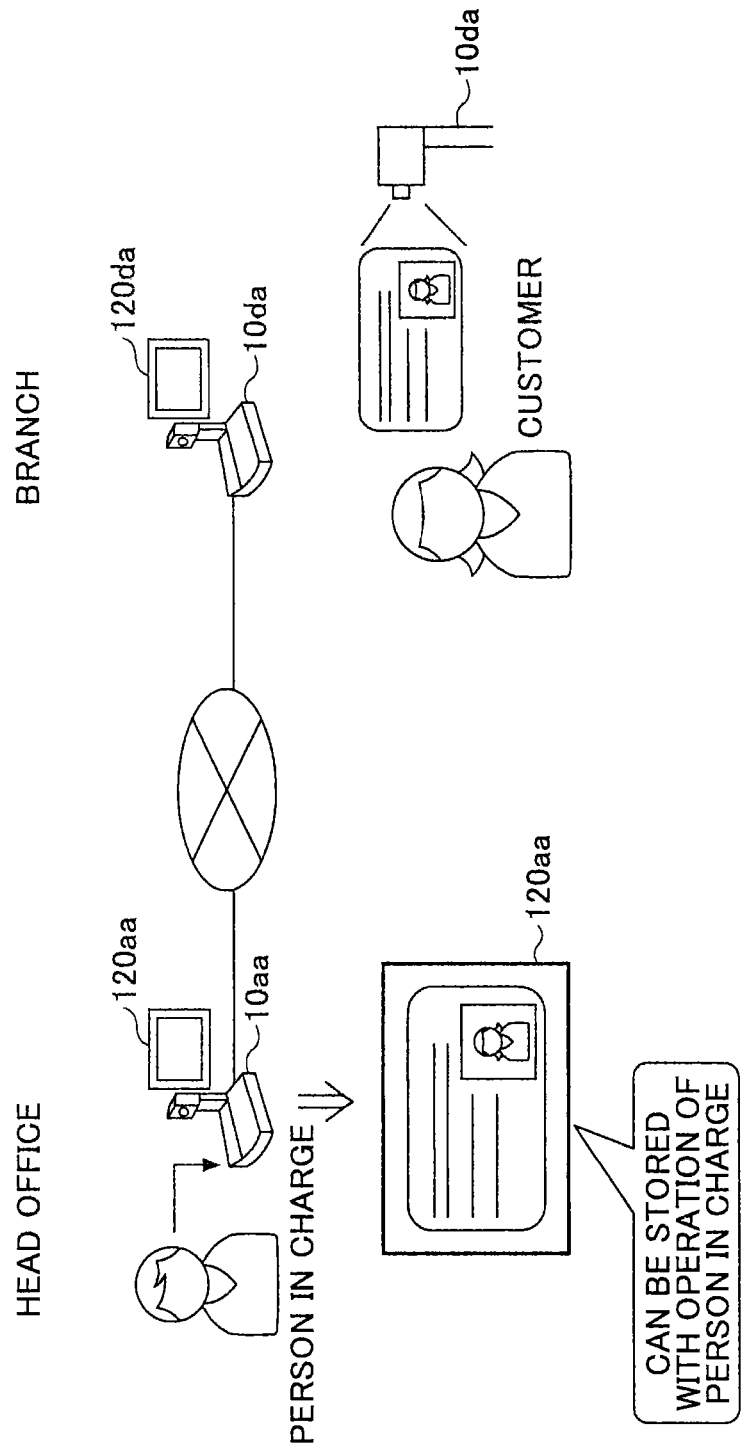

COMMUNICATION TERMINAL, COMMUNICATION SYSTEM, AND COMMUNICATION METHOD

TECHNICAL FIELD

The present invention relates to a communication terminal, etc., which connects with a different communication terminal via a communication network.

BACKGROUND ART

A remote conference system is known, wherein users remotely located from one another transmit and receive image data and voice data with call terminals provided with a camera and a microphone to conduct a conference. The respective call terminals display the image data transmitted by the call terminal of the conference counterpart on a display and output voice from a speaker. In this way, the users at multiple locations may conduct such a conference with one another with a sense which compares favorably with a conference conducted in the same conference room.

Such a remote conference system may be provided with a function for a user to perform a predetermined operation to capture a display screen displayed on a display to create a screen shot or transmit the screen shot via a network (see Patent Document 1, for example). Patent Document 1 discloses a network connection system, wherein a screen of a computer held by a conference participant is captured and uploaded periodically or when there is a change therein.

PATENT DOCUMENT

Patent Document 1: JP2007-323285A

Now, the remote conference system can be applied not only to a conference, but to various systems. For example, installing the call terminals at a branch and at a head office allows a user who visits the branch to receive, via the call terminal, a service which can be received only by a user who visits the head office. In a different example, when the call terminals can be utilized on the user side at home and at a help desk, the user can make an inquiry with a sense such that the user is directly facing the staff of the help desk.

FIG. 29 is one example of a diagram which schematically illustrates a call system applied to a procedure in which personal verification is required, such as life insurance. Providing a call terminal 10*aa* at a head office and a call terminal 10*da* at a branch allows a customer to visit the branch which is close to the customer's home and face the person in charge via a communication network to conduct the procedure. With the procedure for the personal verification, the person in charge on the branch side often makes a duplicate of a personal verification document such as a driver's license and sends it by post to the head office to store it therein. While the duplicate of the personal verification document may be sent by post from the branch to the head office together with an application document, etc., the ability to store the duplicate of the personal verification document as well as a digital version of the application document using the call terminal is convenient.

Then, a call system is being investigated, wherein a personal verification document is imaged with a camera of a communication terminal on the customer side, electronically transmitted to a head office where a person in charge is located, allowing the transmitted results to be printed on the head office side. In this case, the customer images the personal verification document with the camera of the communication terminal and image data are displayed on a display 120*aa* of the call terminal on the head office side. The duplicate of the personal verification document may be stored at the head office if the person in charge on the head office side performs an operation of capturing a display screen of the display 120*aa* on which the personal verification document is displayed.

DISCLOSURE OF THE INVENTION

In view of the above-described background art, an object of the present invention is to provide a call terminal which makes it possible to capture the display screen under agreement with a communication counterpart.

According to one Embodiment of the present invention, a communication terminal which communicates with a different communication terminal via a communication network is provided, including a display control unit which displays image data imaged by the different communication terminal on a display unit; and an image data storage unit which stores the image data displayed on the display unit in a capture storage unit when information indicating a permission to store is received from the different communication terminal.

The communication terminal according to the Embodiment of the present invention makes it possible to capture the display screen under agreement with a communication counterpart.

BRIEF DESCRIPTION OF THE DRAWINGS

Other objects, features, and advantages of the present invention will become more apparent from the following detailed descriptions when read in conjunction with the accompanying drawings, in which:

FIG. 8 is a conceptual diagram illustrating a relay apparatus management table;

FIG. 9 is a conceptual diagram illustrating a terminal authentication management table;

FIG. 10 is a conceptual diagram illustrating a terminal state management table;

FIG. 11 is a conceptual diagram illustrating a destination list management table;

FIG. 12 is a conceptual diagram illustrating a session management table;

FIG. 15 is one example of a diagram schematically illustrating a procedure for capturing a display screen by a screen capture application;

FIG. 16 is one example of a sequence diagram illustrating a procedure for the communication terminal 10aa to image, multiple times, the image data transmitted from the communication terminal 10da;

FIG. 18 is a diagram illustrating one example of an area-terminal correspondence table managed by a display control unit;

FIG. 20 is a diagram illustrating one example of a process selection screen displayed on a display;

FIG. 29 is one example of a diagram which schematically illustrates a call system applied to a procedure in which personal verification is required, such as life insurance.

BEST MODE FOR CARRYING OUT THE INVENTION

Embodiment 1

Figure 1:
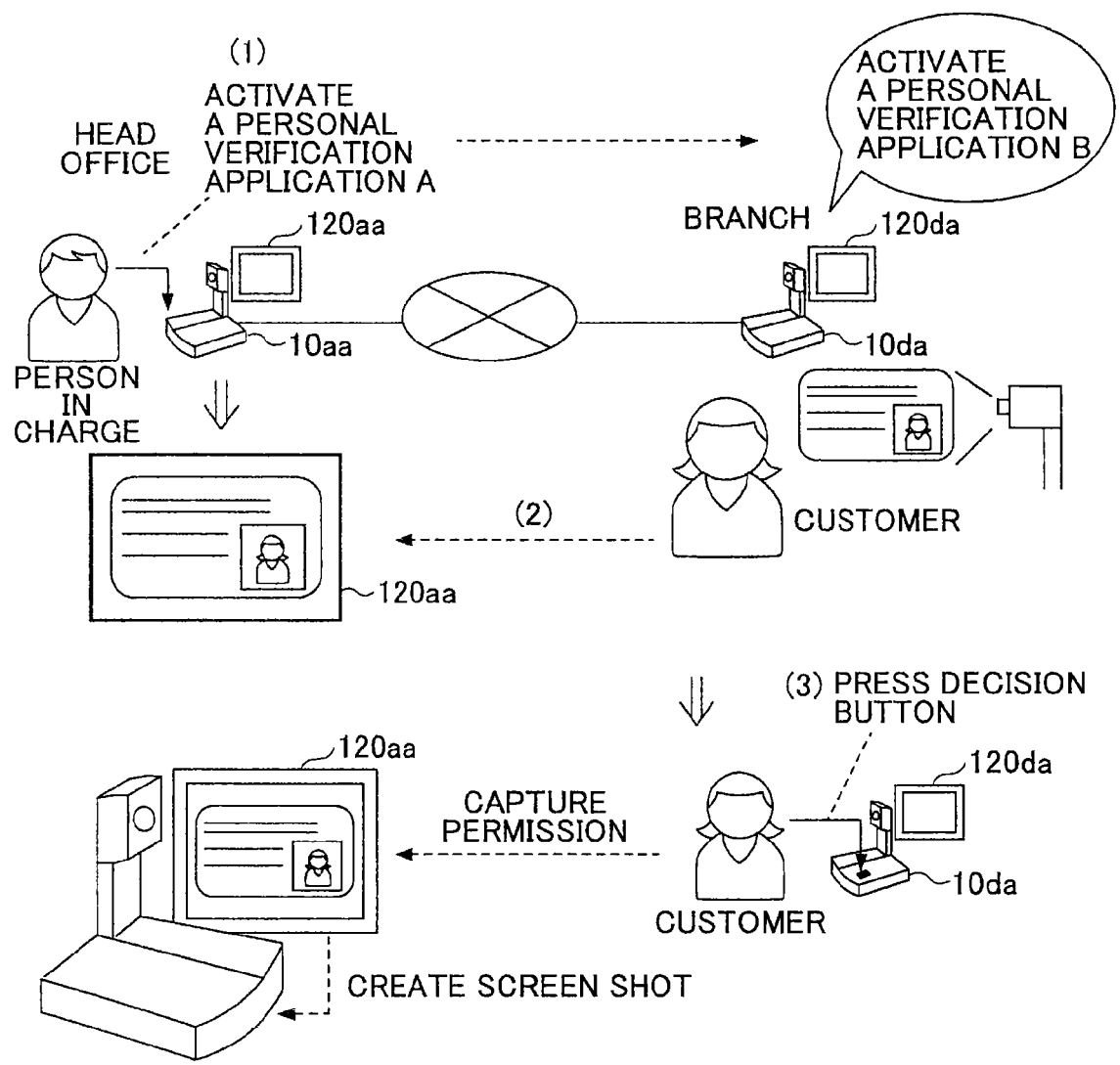
FIG. 1 is an exemplary diagram for explaining a schematic operation of a call system according to the present Embodiment.

FIG. 1 is an exemplary diagram for explaining a schematic operation of a call system according to the present Embodiment.

A call terminal 10aa is provided on the company side, while a call terminal 10da is provided at a remote location (below merely called "the customer side") such as home or the branch side. The customer holds a personal verification document, which can be imaged with a camera included in the call terminal 10da.

(1) The person in charge at the head office activates a personal verification application A in order to obtain image data of the personal verification document. The call terminal 10da activates a personal verification application B by a report from the personal verification application A. Image data of the customer, etc., that are imaged by the call terminal 10da are transmitted to the call terminal 10aa and displayed on the display 120aa, but cannot be stored in the call terminal 10aa.

(2) Using instructions, etc., from the person in charge at the head office, the customer images the personal verification document with the camera of the call terminal 10da.

(3) Then, when the customer presses a decision button in accordance with an explanation by the person in charge, a capture permission is reported from the call terminal 10da to the call terminal 10aa, and a screen shot of a display screen on which the personal verification document is displayed is created by the personal verification application A.

In this way, as the call terminal 10aa on the head office side cannot capture the display screen unless an agreement of the customer is obtained, the call terminal of the present Embodiment makes it possible to prevent from storing image data not desired for storage by the customer. Therefore, when the person in charge and the customer conduct a procedure requiring a duplicate of the personal verification document by the call system, the duplicate of the personal verification document may be created only when there is such an agreement. Moreover, storing important documents and confidential information that are used in a conference, etc., without permission by the owner thereof may be prevented, making it possible to apply the call system in various meetings and conferences, etc., in which such important documents are used.

Overall Configuration of the Embodiment

Figure 2:
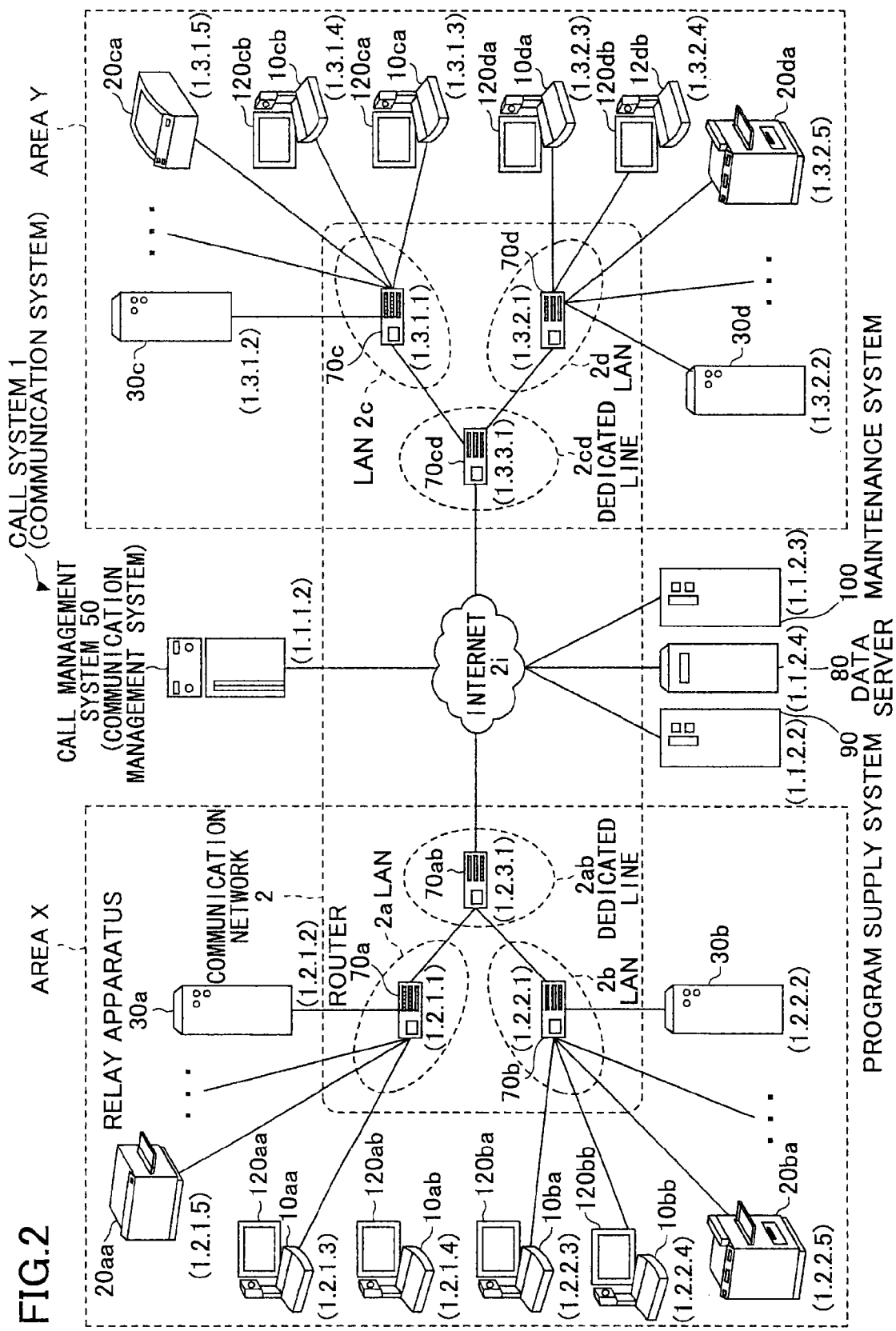
FIG. 2 is a schematic diagram of the call system according to one Embodiment of the present invention.

FIG. 2 is a schematic diagram of a call system according to one Embodiment of the present invention. As shown in FIG. 2, the call system 1 includes multiple call terminals (10aa, 10ab, . . . ); displays (120aa, 120ab, . . . ) for the respective call terminals (10aa, 10ab, . . . ); multiple printing terminals (20a, 20b, 20c, 20d); multiple relay apparatuses (30a, 30b, 30c, 30d); a call management system 50; a program provision system 90; a data server 80; a maintenance system 100; and printing terminals (20aa, 20ba, 20ca, 20da). With this call system 1, communication of image data and voice data as one example of call data may be conducted to implement a teleconference, etc., between remote locations. Multiple routers (70a, 70b, 70c, 70d, 70ab, 70cd) select an optimal route for the call data.

Moreover, the call terminals (10aa, 10ab, a printing terminal 20aa, the relay apparatus 30a, and the router 70a are communicatively connected by a LAN 2a. The call terminals (10ba, 10bb, . . . ), the printing terminal 20ba, the relay apparatus 30b, and the router 70b are communicatively connected by a LAN 2b. Moreover, the LAN 2a and the LAN 2b are communicatively connected by a dedicated line 2ab which includes the router 70ab. Moreover, the LAN 2a, the LAN 2b, and the dedicated line 2ab are built within a predetermined area X. For example, the area X is Japan, the LAN 2a is built within a Tokyo business office, and the LAN 2b is built within an Osaka business office.

On the other hand, the call terminals (10ca, 10cb, . . . ), the printing terminal 20ca, the relay apparatus 30c, and the router 70c are communicatively connected by the LAN 2c. The call terminals (10da, 10bb, . . . ), the printing terminal 20da, the relay terminal 30d, and the router 70d are communicatively connected by the LAN 2d. Moreover, the LAN 2c and the LAN 2d are communicatively connected by a dedicated line 2cd which includes the router 70cd. Moreover, the LAN 2c, the LAN 2d, and the dedicated line 2cd are built within a predetermined area Y. For example, an area Y is the Unites States, the LAN 2c is built within a New York business office, and the LAN 2d is built within a Washington D.C. business office. The respective areas A and Y are communicatively connected via an Internet 2i from the routers (70ab, 70cd).

Below, an arbitrary call terminal of multiple call terminals (10aa, 10ab, . . . ) is represented as "a call terminal 10"; an arbitrary display of multiple displays (120aa, 120ab, . . . ) is represented as "a display 120"; an arbitrary printing terminal of multiple printing terminals (20aa, 20ba, . . . ) is represented as "a printing terminal 20"; and an arbitrary relay apparatus of multiple relay apparatuses (30a, 30b, . . . ) is represented as "a relay apparatus 30". Moreover, a terminal as a requestor which requests a start of a teleconference is represented as "a requestor terminal", while a terminal as a destination to send a request to (a relay destination) is represented as "a destination terminal". Furthermore, an arbitrary router of routers (70a, 70b, 70c, 70d, 70ab, 70cd) is represented as "a router 70". Moreover, an arbitrary terminal of printing terminals (20aa, 20ba, 20ca, . . . ) is represented as "a printing terminal 20".

Moreover, a call management system 50, a program supply system 90, a maintenance system 100, and a data server 80 are connected to the Internet 2i. The call management system 50, the program supply system 90, the maintenance system 100, and the data server 80 may be installed in area X or area Y, or may be installed in other areas.

Moreover, in the present Embodiment, the communication network 2 according to the present Embodiment is built by the LAN 2a, the LAN 2b, the dedicated line 2ab, the Internet 2i, the dedicated line 2cd, the LAN 2c, and the LAN 2d. This communication network 2 may include a location in which communication is conducted not only by wired but also by wireless such as Wi-Fi (Wireless Fidelity), Bluetooth (registered copyright), Transfer Jet (registered copyright), NFC, etc.

Moreover, in FIG. 2, four sets of numbers that are shown under the call terminal 10, the printing terminal 20, the relay apparatus 30, the call management system 50, the respective routers 70, the program supply system 90, the maintenance system 100, and the data server 80 indicate IP addresses in a general IPv4 in a simplified manner. For example, the IP address for the call terminal 10aa is "1.2.1.3". Moreover, while IPv6, not IPv4, may be used, an explanation is given with IPv4 to simplify the explanations.

The respective call terminals 10 may be used not only in a call among multiple business offices and a call among difference rooms in the same business office, but also in a call within the same room, and a call between outdoors and indoors, or between outdoors and outdoors. When the respective call terminals 10 are used outdoors, communication is conducted via wireless such as a mobile telephone communication network, etc.

Here, the communication terminal 10 shown in FIG. 2 is a terminal which realizes a call for a user (a person in charge) by transmission and reception of call data, and is a teleconference terminal, for example. Moreover, the printing terminal 20 is a terminal which prints, onto a sheet, print data such as image data, text data, etc., and is a printer, facsimile machine, a copying machine, or a MFP (multi-function peripheral) in which these functions are combined.

Moreover, the relay apparatus 30 is a computer system which relays call data among multiple call terminals 10. The call management system 50 is a computer system which integrally manages communication conditions, etc., of the relay apparatus 30, destination list management, management of communication condition and operation status of the call terminal 10 and the printing terminal 20, and a log-in authentication from the call terminal 10 and the printing terminal 20. The image in the image data may be a video image or a still image, or may be both the video image and the still image.

The program supply system 90 is a computer system which provides, via a communication network 2 to the respective ones of the call terminal 10, the printing terminal 20, the relay apparatus 30, the call management system 50, and the maintenance system 100, programs for use by the respective ones.

The data server 80 stores a screen shot of a personal verification document that is uploaded by the respective call terminal 10 and, moreover, controls viewing for a request for viewing the screen shot.

The maintenance system 100 is a computer system for sustaining, managing, or maintaining at least one of the call terminal 10, the print terminal 20, the relay apparatus 30, the call management system 50, and the program supply system 90. For example, when the maintenance system 100 is installed domestically and the call terminal 10, the print terminal 20, the relay apparatus 30, the call management system 50, or the program supply system 90 is installed abroad, the maintenance system 100 remotely conducts, via the communication network 2, maintenance operations such as sustenance, management, maintenance, etc., of at least one of the call terminal 10, the print terminal 20, the relay apparatus 30, the call management system 50, or the program supply system 90 Moreover, the maintenance system 100 conducts, not via the communication network 2, maintenance of management of failure history, maintenance inspection, customers, manufacturing numbers, model numbers, etc., of at least one of the call terminal 10, the print terminal 20, the relay apparatus 30, the call management system 50, and the program supply system 90.

Figure 3:
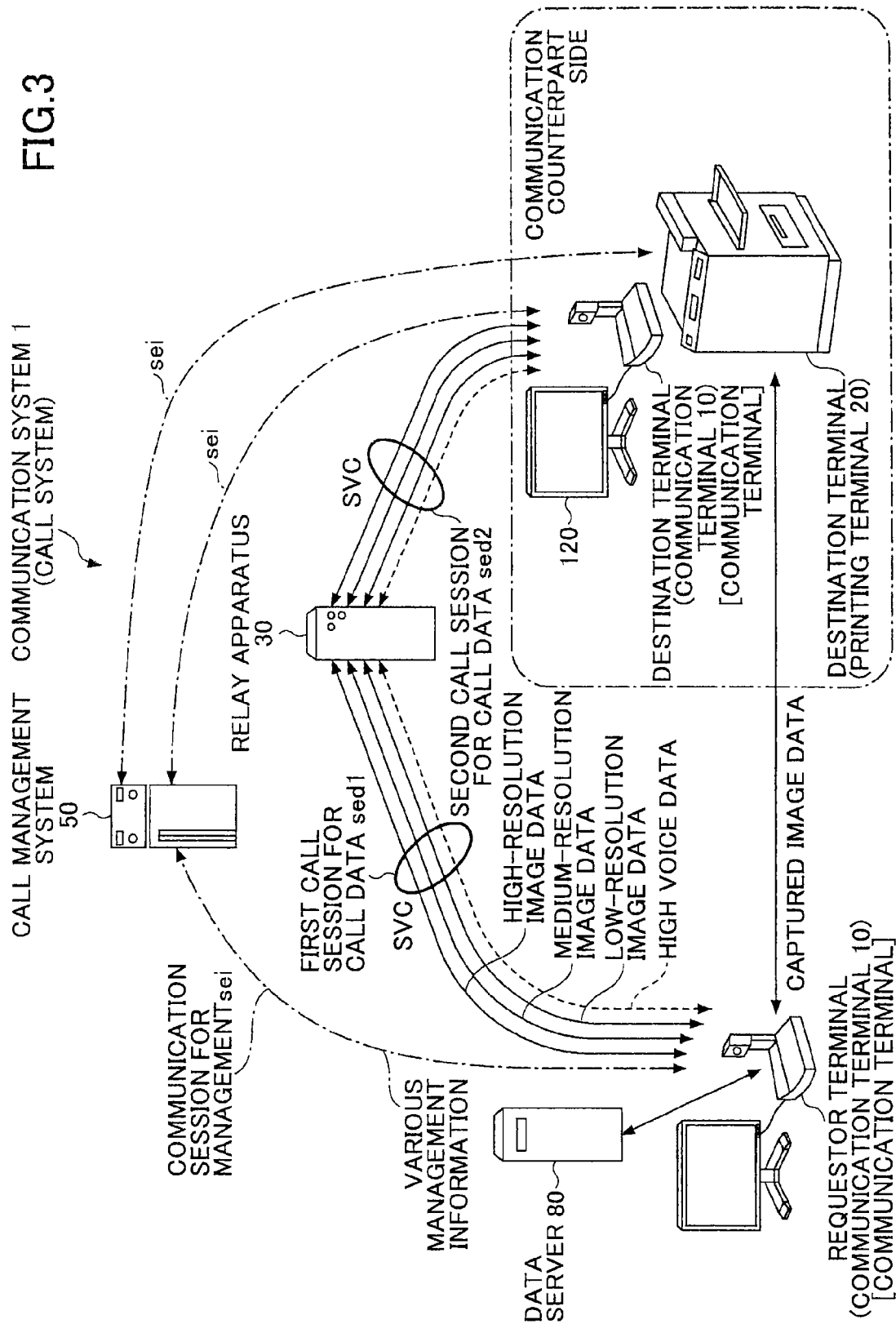
FIG. 3 is a schematic diagram illustrating a communication condition for realizing a call between call terminals.

Next, using FIG. 3, a communication condition for realizing a call between two call terminals is described. FIG. 3 is a conceptual diagram illustrating the communication condition for realizing the call between the call terminals.

In this call system 1, transmission and reception of various data sets for a call are conducted between the requestor terminal (the call terminal 10), which is a requestor of starting the call, and a destination terminal (the call terminal 10) as a communication counterpart of this requestor terminal. Moreover, print data are transmitted from the requestor terminal (call terminal 10) to the printing terminal 20 as a communication counterpart of this requestor terminal, and the print data are printed onto a sheet of paper in the printing terminal 20. The call terminal 10 has mainly a function for making a call, while the printing terminal 20 has mainly a function for printing, so that the respective processing capabilities differ.

Moreover, a communication session sei for management for transmitting and receiving various information sets is established between the requestor terminal and the call management system 50, between the destination terminal (call terminal 10) and the call management system 50, and between the destination terminal (printing terminal 20) and the call management system 50. Furthermore, this communication session sei is also a communication session for call control.

Moreover, the respective call terminals 10 use a communication scheme by predetermined call control and encoding schemes via the relay apparatus 30 to communicate call data.

Examples of the call control scheme include (1) SIP (Session Initiation Protocol), (2) H.323, (3) extended SIP protocol; (4) Instant messenger protocol; (5) Protocol using MESSAGE method in SIP; (6) Internet relay chat protocol (IRC (Internet Relay Chat)); (7) Protocol extending the Instant messenger protocol, etc. Of these, the Instant messenger protocol (4) is, for example, the protocol used in (4-1) XMPP (extensible messaging and presence protocol), (4-2) ICQ (registered trademark), AIM (registered trademark), Skype (registered trademark), etc. Moreover, (7) the Protocol extending the Instant messenger protocol is Jingle, for example.

Exemplary encoding schemes include H.264/SVC (scalable video coding), H.264/AVC (advanced video coding), etc. More specifically, when the encoding scheme is H.264/SVC, a first communication session sed1 for a call is established for transmitting and receiving four call data sets of high-resolution image data; medium-resolution image data; low-resolution image data; and voice data between the relay apparatus 30 and the call terminal 10 as the requestor terminal. Moreover, a second communication session sed2 for a call is established for transmitting and receiving four call data sets of high-resolution image data; medium-resolution image data; low-resolution image data; and voice data between the relay apparatus 30 and the call terminal 10 as the destination terminal.

Hardware Configuration of the Embodiment

Next, a hardware configuration of the present Embodiment is described. The call terminal 10 can be realized by a dedicated hardware unit (product) or a generic information processing apparatus, so that an external view thereof varies. For example, the external views include the external view shown in FIG. 2 or 3, or an external view of a PC (Personal Computer), a tablet, a smartphone, a PDA (personal digital assistant), etc. For the tablet, the smartphone, or the PDA, the display 120 is embedded in the call terminal 10. Moreover, even when the display 120 is not embedded therein, the call terminal 10 may include a projector to project what is displayed on the display 120.

The external view of the relay apparatus 30, the call management system 50, the program supply system 90, the maintenance system 100, and the data server 80 is the same as that for the general server computer, so that the explanation of the external view is omitted.

Figure 4:
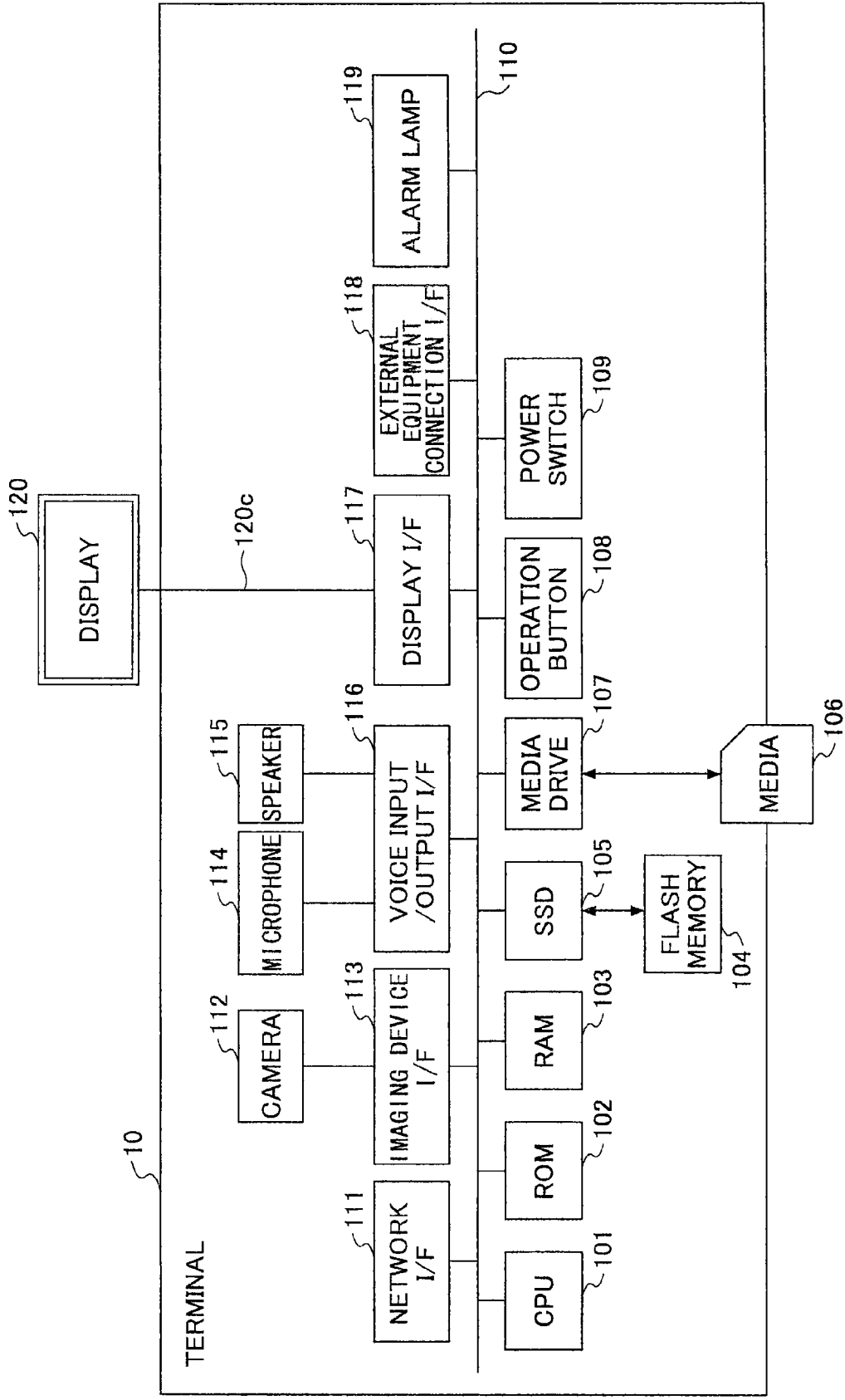
FIG. 4 is a hardware configuration diagram illustrating the call terminal according to the present Embodiment.

FIG. 4 is a hardware configuration diagram of the call terminal according to the present Embodiment. As shown in FIG. 4, the call terminal 10 according to the present Embodiment includes a CPU (central processing unit) 101 which controls an operation of the overall call terminal 10; a ROM (Read-only memory) 102 having stored therein a program for use in driving the CPU 101, such as an IPL (initial program loader), etc.; an RAM (Random access memory) 103 for use as a work area for the CPU 101; a flash memory 104 having stored thereon various programs and data sets such as programs for the call terminal 10, image data, voice data, etc.; an SSD (solid state drive) 105 which controls reading or writing of various data sets from/to the flash memory 104 in accordance with control of the CPU 101; a media drive 107 which controls reading or writing (storage) of data from/to the recording medium 106 such as a flash memory, etc.; an operation button 108 which is operated when a destination of the call terminal 10 is designated, etc.; a power switch 109 for turning ON/OFF power of the call terminal 10; and a network I/F (interface) 111 for using a communication network 2 to conduct data transmission.

Moreover, the call terminal 10 includes an embedded-type camera 112 which images an object to obtain image data in accordance with control of the CPU 101; an imaging device I/F 113 which controls driving of this camera 112; an embedded-type microphone 114 for inputting voice; an embedded-type speaker 115 for outputting voice; a voice input/output I/F 116 which processes input and output of a voice signal between the microphone 114 and the speaker 115 in accordance with control of the CPU 101; a display I/F 117 which transmits image data to an external display 120 in accordance with control of the CPU 101; an external equipment connection I/F 118 for connecting various external equipment units; an alarm lamp 119 which reports abnormalities of various functions of the call terminal 10; and a bus line 110 such as an address bus, a data bus, etc., for electrically connecting the above-described respective elements as shown in FIG. 4.

The display 120 is a display unit which includes organic EL and liquid crystal, which displays an object image, operations, etc. Moreover, the display 120 is connected to the display I/F 117 via a cable 120c. This cable 120c may be a cable for an analog RGB (VGA) signal, may be a cable for component video, and may be a cable for HDMI (registered copyright) (High-Definition Multimedia Interface) or a cable for a DVI (Digital Video Interactive) signal.

The camera 112 includes a lens and a solid-state imaging device which converts light to electrical charges to digitize an image (video) of the object; for the solid-state imaging device, CMOS (complementary metal oxidesemiconductor), CCD (charge coupled device), etc., are used.

To the external equipment connection I/F 118, external equipment units such as an externally-installed camera, an externally-installed microphone; an externally-installed speaker, etc., can be electrically connected respectively. When the externally-installed camera is connected, the externally-installed camera is driven with a precedence over the embedded camera 112 in accordance with control of the CPU 101. When the externally-installed microphone is connected or when the externally-installed speaker is connected, the externally-installed microphone or the externally-installed speaker is driven with a precedence over the embedded-type microphone 114 or the embedded-type speaker 115 in accordance with control of the CPU 101.

The recording media 106 is configured to be removable with respect to the call terminal 10. Moreover, for a non-volatile memory which reads or writes data in accordance with control of the CPU 101, not only the flash memory 104, but also an EEPROM (Electrically erasable and programmable ROM), etc., may be used.

Figure 5:
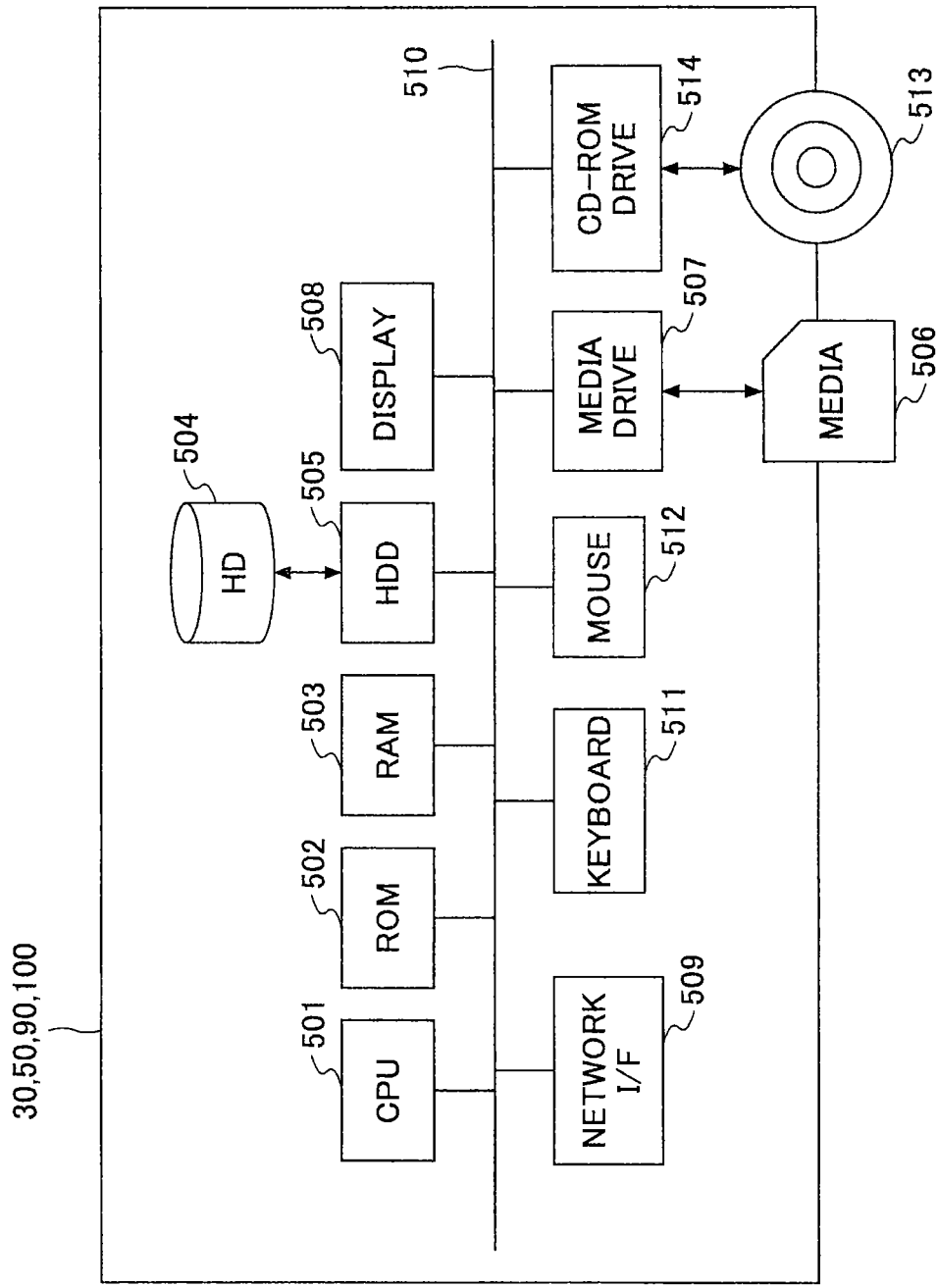
FIG. 5 is a hardware configuration diagram illustrating a call management system.

FIG. 5 is a hardware configuration diagram of the call management system 50 according to the present Embodiment. The call management system 50 includes a CPU 501 which controls an operation of the overall call management system 50; a ROM 502 having stored thereon programs for use in driving the CPU 501 such as IPL, etc.; a RAM 503 for use as a work area for the CPU 501; an HD 504 having stored thereon various data sets and programs including programs for the call management system 50; a HDD (hard disk drive) 505 which controls reading or writing (storage) of various data sets from/to the HD 504 in accordance with control of the CPU 501; a media drive 507 which controls reading or writing (storage) of data with from/to the recording media 506 of a flash memory, etc.; a display 508 which displays various information sets such as a cursor, a menu, a window, a character, an image, etc.; a network I/F 509 for conducting data communications using the communication network 2; a keyboard 511 which includes multiple keys for inputting a character, a numerical value, various instructions, etc.; a mouse 512 which performs execution of various selections or designation, a cursor movement, etc.; a CD-ROM drive 514 which controls reading or writing of various data sets from/to a CD-ROM (compact disc read only memory) 513 as one example of a removable recording medium; and a bus line 510 such as a data bus, an address bus, etc., for electrically connecting the above-described respective elements as shown in FIG. 5.

On the other hand, the relay apparatus 30, the program supply system 90, the maintenance system 100, and the data server 80 have the same hardware configuration as for the call management system 50, so that the explanation thereof is omitted. The HD 504 stores thereon various data and programs such as programs for controlling the relay apparatus 30, the program supply system 90, the maintenance system 100, and the data server 80, respectively.

It may be arranged for the respective programs for the call terminal 10, the printing terminal 20, the relay apparatus 30, the program supply system 90, the maintenance system 100, and the data server 80 to be recorded on a computer-readable recording medium (a recording medium 106, etc.) and distributed with a file in an installable or executable format. Moreover, other exemplary recording media includes a CD-R (compact disc recordable), a DVD (digital versatile disk), a blue-ray disk, etc.

Figure 6:
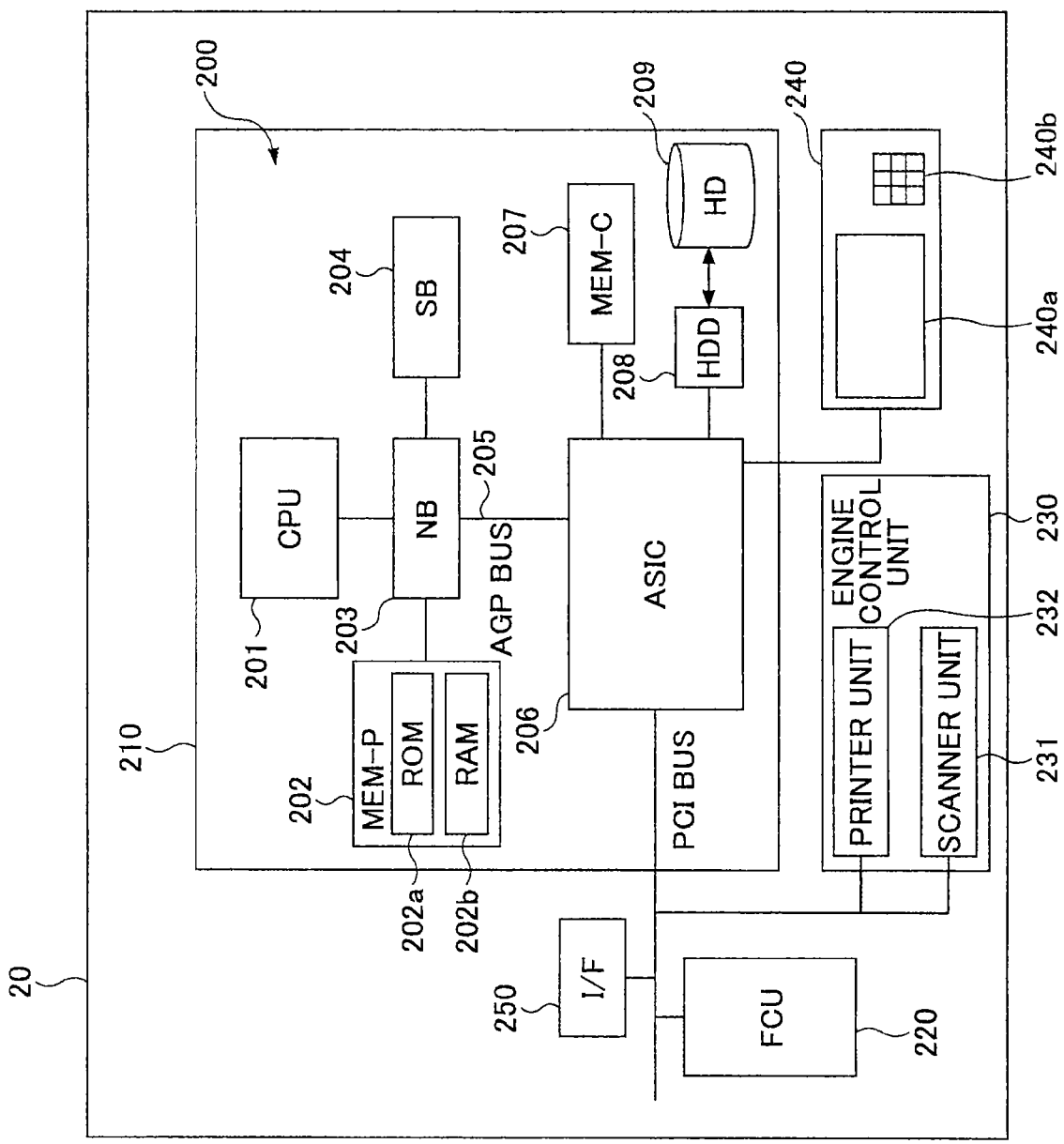
FIG. 6 is a hardware configuration diagram illustrating a printing terminal.

FIG. 6 is a hardware configuration diagram of the call terminal 20 according to the present Embodiment. The printing terminal 20 in this case is an MFP.

As disclosed in FIG. 6, the printing terminal 20 includes a controller 210, an FCU (fax control unit) 220, an engine control unit 230, an operating face 240; and a communication interface unit 250. Of these, the engine control unit 230 includes a scanner unit 231 and a printer unit 232. Moreover, the operating face 240 includes a panel display unit 240a such as a touch panel, etc., that displays a present set value, a selected screen, etc., and accepts input from an operator; and an operation unit 240b including a ten key which accepts a set value of a condition on image formation such as setting condition of concentration, a start key which accepts copying instructions, etc. The controller 210 controls the overall printing terminal 20, and, for example, controls input from the operating face 240, communication, drawing, etc. The scanner unit 231 or the printer unit 232 includes a unit for image processing such as error diffusion, gamma transformation, etc.

With an application switching key of the operating face 240, the printing terminal 20 can successively switch between a document box function, a copying function, a printer function, and a facsimile function to select the switched result, so that it turns to a document box mode when the document box function is selected, a copying mode when the copying function is selected, and a facsimile mode when the facsimile function is selected.

The controller 210 includes a CPU 201, which is a main part of a computer; a system memory (MEM-P) 202; a north bridge (NB) 203, a south bridge (SB) 204, an ASIC (application specific integrated circuit) 206; a local memory (MEM-C) 207, which is a storage unit; an HDD 208; and an HD 209, which is a storage unit, and is configured such that an AGP (accelerated graphics port) bus 205 connects the NB 203 and the ASIC 206.

Of these, the CPU 201 is a control unit which controls the overall printing terminal 20. The NB 203, which is a bridge for connecting the CPU 201, the MEM-P 202, the SB 204, and the AGP bus 205, includes an AGP target and a PCI (peripheral component interconnect) master, and a memory controller which controls reading and writing, etc., from/to the MEM-P 202.

The MEM-P 202 includes a ROM 202a, which is a memory for storing data and programs for causing the respective functions of the controller 210 to be realized; an RAM 202b for use as a memory for drawing at the time of memory printing, and development of the data and programs. It may also be configured for the programs stored in the RAM 202b to be recorded and provided on a computer-readable recording medium such as a CD-ROM, FD, CD-R, DVD, etc., in a file with an installable or executable format.

The SB 204 is a bridge for connecting the NB 203 with a PCI device and a peripheral device. The ASIC 206, which is an IC (integrated circuit) for use in image processing that includes a hardware element for image processing, has a role of a bridge which connects the AGP bus 205, the PCI bus, the HDD 208, and the MEM-C 207. This ASIC 206 includes a PCI unit which transfers data via a PCI bus between the scanner unit 231 and the printer unit 232; multiple DMACs (Direct Memory Access Controllers) which perform rotation, etc., of image data by a hardware logic; a memory controller which controls the MEM-C 207; an arbiter (ARB) which forms the core of the ASIC 206; and an AGP master and a PCI target. The FCU 220 is connected to this ASIC 206 via the PCI bus. It may also be arranged to connect not only the FCU 220, but also an USB (universal serial bus) interface and an IEEE 1394 (institute of electrical and electronics engineers 1394) interface to the ASIC 206.

The MEM-C 207 is a local memory for use as a code buffer and an image buffer for copying. The HD 209 is storage for accumulating image data, font data used at the time of printing, and forms. The HD 209 controls reading or writing of data from/to the HD 209 in accordance with control of the CPU 201. The AGP bus 205 is a bus interface for a graphics accelerator card proposed for accelerating graphics processing; directly accessing MEM-P 202 with high throughput may accelerate the graphics accelerator card.

Functional Configuration of the Embodiment

Figure 7:
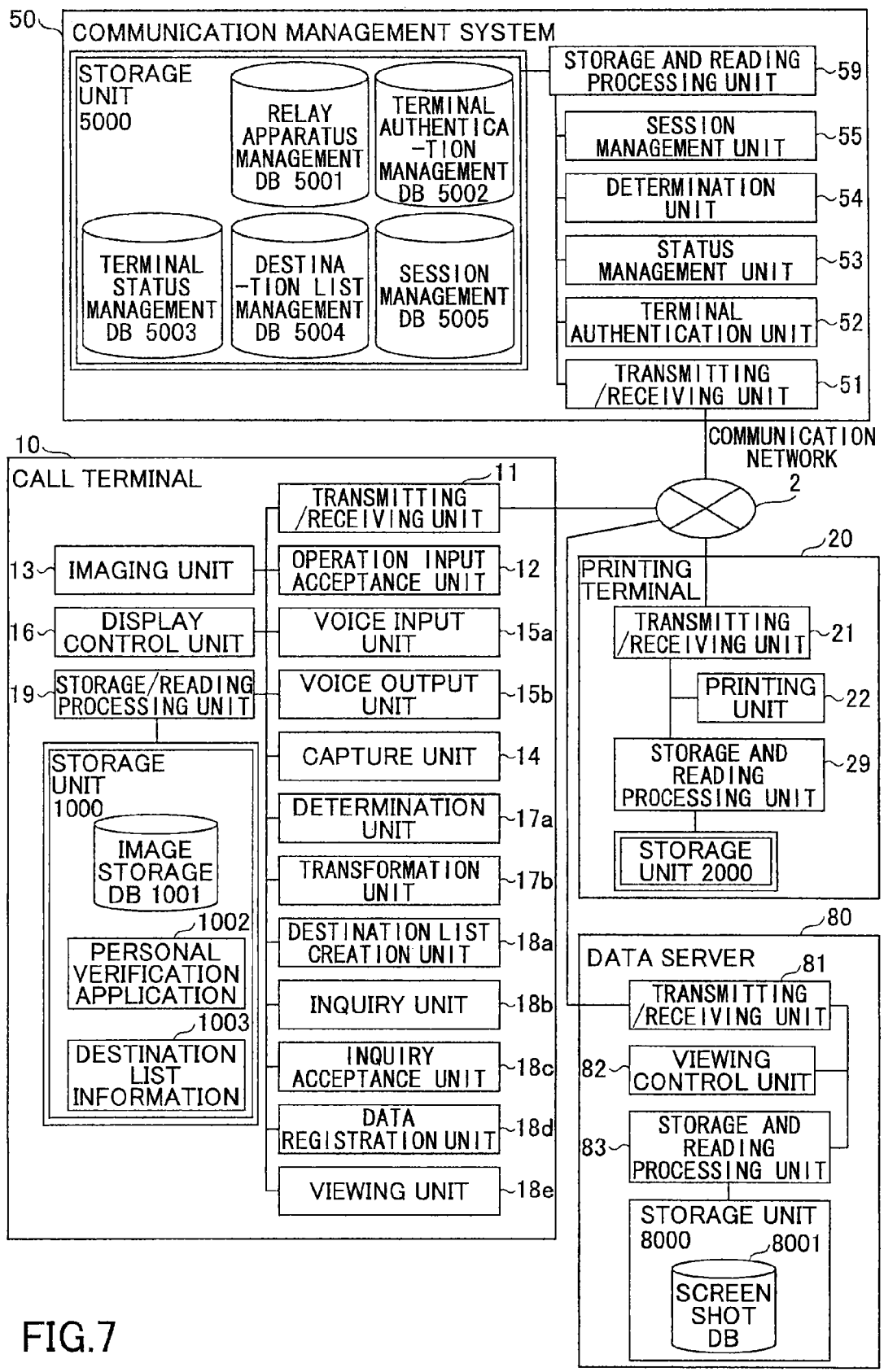
FIG. 7 is an exemplary functional block diagram illustrating the call terminal, the printing terminal, the call management system, and a data server that make up a part of the call system.

Next, a functional configuration of the present Embodiment is described. FIG. 7 is a functional block diagram illustrating the call terminal 10, the printing terminal 20, the call management system 50, and the data server 80 that make up a part of the call system 1 according to the present Embodiment. Connections are made in FIG. 7 for the call terminal 10, the printing terminal 20, the call management system 50, and the data server 80 to conduct data communication via the communication network 2.

Functional Configuration of the Call Terminal

The call terminal 10 includes a transmitting and receiving unit 11; an operation input acceptance unit 12; an imaging unit 13; a capture unit 14; a voice input unit 15a; a voice output unit 15b; a display control unit 16; a determination unit 17a; a transformation unit 17b; a destination list creation unit 18a, an inquiry unit 18b, an inquiry acceptance unit 18c; a data registration unit 18d; a viewing unit 18e; and a storage and reading processing unit 19. These respective units are functions or means realized by any of the respective constituting elements shown in FIG. 4 operating by instructions from the CPU 101 in accordance with programs for the call terminal 10 that are developed on the RAM 103 from the flash memory 104.

Moreover, the call terminal 10 includes the RAM 103, which is shown in FIG. 4; and a storage unit 1000 which is configured by the flash memory 104 shown in FIG. 4. Destination list information 1003, a personal verification application 1002, and an image storage DB 1001 that are described below are stored in this storage unit 1000.

The Respective Functional Configurations of the Call Terminal

The transmitting/receiving unit 11 of the call terminal 10 shown in FIG. 7 is realized by the network I/F 111 shown in FIG. 4, and instructions from the CPU 101 shown in FIG. 4, and conducts transmission and reception of various data (or information) with a different terminal, apparatus, or system via the communication network 2. Before starting a call with a desired destination terminal, this transmitting/receiving unit 11 starts receiving the respective status information sets which indicate a status of the respective terminals as a candidate communication counterpart.

Moreover, in the transmitting/receiving unit 11, with an acceptance of the above-described power on as a trigger, the present IP address of the requestor terminal and log-in request information indicating that a log-in is to be requested are automatically transmitted to the call management system 50 via the communication network 2. Moreover, when the user changes the power switch 109 from a ON state to OFF, the transmitting/receiving unit 11 transmits, to the call management system 50, status information that a power supply is to be turned OFF, after which the operation input acceptance unit 12 turns the power OFF completely. In this way, the fact that the call terminal 10 has switched from the power ON status to the power OFF may be grasped on the call management system 50 side. It may also be arranged for the trigger for the log-in requirement to be not the power on, but instruction inputting by the user into the call terminal 10.

The operation input acceptance unit 12, which is realized by instructions from the CPU 101 shown in FIG. 4, accepts various inputs by the user. For example, when the user turns ON the power switch 109 of the call terminal, the operation input acceptance unit 12 shown in FIG. 7 accepts the power ON to turn ON the power supply.

The imaging unit 13, which is realized by the imaging device I/F 113 and the camera 112 shown in FIG. 4, and instructions from the CPU 101 shown in FIG. 4, images the subject to output image data obtained by this imaging.

The capture unit 14, which is realized by instructions from the CPU 101 shown in FIG. 4, captures a screen which is displayed on the display 120 by the display control unit 16 when a permission to capture a personal verification document is received from an inquiry acceptance unit 18c of a call terminal of a conference counterpart. At the time of the capturing, a tone such as an effect tone from a voice output unit 15b such that it is easy to recognize for the customer. The storage and reading processing unit 19 temporarily stores a captured screen shot to an image storage DB 1001. The temporarily stored screen shot is transmitted to the data server 80 via the communication network 2 from the transmitting and receiving unit 11 by the person in charge.

As for the voice input unit 15a, which is realized by a voice input and output I/F 116 and instructions from the CPU 101 shown in FIG. 4, after voice of the user is converted to a voice signal by the microphone 114, voice data related to this voice signal is input thereto. The voice output unit 15b, which is realized by the voice input and output I/F 116, and the instructions from the CPU 101 shown in FIG. 4, outputs the voice signal related to the voice data to the speaker 115, from which the voice is output.

The display controller 16 is realized by the display I/F 117, and instructions from the CPU 101 shown in FIG. 4, performs control for transmitting, to the display 120, image data in which image data imaged by the imaging unit and image data received from the call terminal of the conference counterpart are combined.

The determination unit 17a, which is realized by instructions from the CPU 101 shown in FIG. 5, determines whether there is no error based on the below-described response information. Moreover, the determination unit 17a compares an image data format at the time of capturing by the capture unit 14 and an image data format which is printable by a destination terminal (the printing terminal 20) indicated in response information, and determines whether it is necessary to convert it to an image data format to be transmitted to the destination terminal (printing terminal 20).

The transformation unit 17b is realized by instructions from the CPU 101 shown in FIG. 4; when the capability information indicating processing capabilities of the printing terminal 20 is received by the transmitting/receiving unit 11, it transforms a screen shot captured by the capture unit 14 in accordance with the capability information. For example, the capabilities information indicates the number of bits for the image data that can be processed by the printing terminal 20; the transformation unit 17b transforms the captured image data into the image data having the number of bits which can be processed by the printing terminal 20. More specifically, the transformation unit 17b transforms 24-bit color image data to 8-bit greyscale image data. Moreover, the capability information indicates the encoding scheme of data which can be processed by the printing terminal 20; the transformation unit 17b transforms the image data captured by the capture unit 14 into the encoding scheme which can be processed by the printing terminal 20. More specifically, the transformation unit 17b transforms it into the encoding scheme related to TIFF, Post Script, PDF, or JPEG.

Based on a below-described terminal status management table which is received from the call management system 50, the destination list creation unit 18a creates destination list information 1003 and creates a destination list screen based on the destination list information 1003. The destination list screen is a screen which selectably displays a list of printing terminals 20 of the destination list information 1003, details of which are omitted.

The inquiry unit 18b inquires whether image data may be stored in a call terminal which transmits image data (the inquiry unit 18b is one example of a permission requesting unit in the claims). In response to the inquiry from the inquiry unit 18b, or the inquiry acceptance unit 18c transmits a capture permission that image data may be stored even without an inquiry.

The data registration unit 18d registers, with the data server 80, the screen shot which is captured by the capture unit 14 and stored in the image storage DB 1001. The IP address of the data server 80 is reported from the call management system 50 to the call terminal, or set in the personal verification application A in advance.

When the person in charge views the screen shot registered with the data server 80, the viewing unit 18e downloads the screen shot from the data server 80. The viewing unit 18e is a browser application, for example.

The storage and reading processing unit 19, which is realized by instructions from the CPU 101 shown in FIG. 4, or executed by the SSD 105 shown in FIG. 4 and the instructions from the CPU 101 shown in FIG. 4, performs processing of storing various data sets to the storage unit 1000, or reading various data sets stored into the storage unit 1000. This storage unit 1000 has stored thereon a terminal ID (identification) for identifying the call terminal 10; a password, etc.

Each time image data and voice data are received when conducting a call with a destination terminal, the received data are overwritten and stored in the storage unit 1000. Image is displayed on the display 120 by image data before being overwritten, and voice is output from the speaker 115 by voice data before being overwritten.

Now, the personal verification application 1002 is described. When the person in charge presses a below-described predetermined button 1205, the storage and reading processing unit 19 reads the personal verification application 1002 and the CPU 101, in FIG. 4, execute a personal verification application A. In this way, the personal verification application A is activated. The personal verification application A transmits a report which causes a call terminal receiving image data to activate a personal verification application B.

When it is detected that the customer performed a screen capture permission operation (below-described pressing of the decision button 1202) by the operation input acceptance unit 12, the capture permission is transmitted to the call terminal 10 which has the personal verification application A activated. The capture permission may be information indicating that storage is permitted.

Therefore, in the personal verification application 1002, the function as the personal verification application A (for example, the inquiry unit 18*b*) becomes valid when the person in charge activates, while the function as the personal verification application B (for example, the inquiry acceptance unit 18*c*) becomes valid when it is activated by the report from the personal verification application A.

The personal verification application A being activated is an example of operating in "an operation mode" in the claims, while the personal verification application B being activated is an example of operating in "an imaging mode" in the claims.

It is not mandatory for the personal verification applications A and B to be activated, so that it suffices for the function of the personal verification application to be embedded in the program for the call terminal 10.

The terminal ID according to the present Embodiment and the below-described relay apparatus ID represent identification information such as the language, character, symbol, or various signs, etc., that are used for uniquely identifying the terminal 10 and the relay apparatus 30. Moreover, the terminal ID and the relay apparatus ID may be identification information in which at least two are combined out of the language, character, symbol and various signs.

Functional Configuration of the Printing Terminal

The printing terminal 20 includes a transmitting and receiving unit 21; a printing unit 22; and a storage and reading processing unit 29. These respective units are functions or means realized by any of the respective constituting elements shown in FIG. 6 operating by instructions from the CPU 201 in accordance with programs for the printing terminal 20 that are developed on the RAM 102*b*.

Moreover, the printing terminal 20 includes a storage unit 2000 which is configured by the HD 209 shown in FIG. 6 and the RAM 102*b* shown in FIG. 6. Image data sent from the call terminal 10 is stored in this storage unit 2000.

Of the respective functional configurations, the transmitting/receiving unit 21, which is realized by the network I/F 250 shown in FIG. 6, and instructions from the CPU 201 shown in FIG. 6, conducts transmission and reception of various data (or information) with a different terminal, apparatus, or system via the communication network 2.

The printing unit 22, which is realized by the printer unit 232 shown in FIG. 6, and instructions from the CPU 201 shown in FIG. 6, prints image data stored in the storage unit 1000 onto a sheet of paper.

The storage and reading processing unit 29, which is realized by instructions from the CPU 201 shown in FIG. 6, or executed by the HDD 108 shown in FIG. 6 and the instructions from the CPU 201, performs processing of storing various data sets to the storage unit 1000, or reading various data sets stored into the storage unit 1000.

Functional Configuration of Call Management System

The call management system 50 includes a transmitting and receiving unit 51; a terminal authentication unit 52; a status management unit 53; a determination unit 54; a session management unit 55; and a storage and reading processing unit 59. These respective units are functions or means realized by any of the respective constituting elements shown in FIG. 5 operating by instructions from the CPU 201 in accordance with programs for the call management system 50 that are developed on the RAM 203 from the HD 504. Moreover, the call management system 50 includes a storage unit 5000 which is configured by the HD 204 shown in FIG. 5. In this storage unit 2000, DBs (5001, 5002, 5003, 5004, 5005) made up of the respective tables as shown below are configured.

Relay Apparatus Management Table

FIG. 8 is a conceptual diagram illustrating a relay apparatus management table. A relay apparatus management DB 5001 which includes a relay apparatus management table as shown in FIG. 8 is configured in the storage unit 5000. In this relay apparatus management table, for each relay apparatus ID of each relay apparatus 30, an operating status of each relay apparatus 30; received date/time at which status information indicating the operating status is received by the call management system 50; an IP address of the relay apparatus 30; and the maximum data call speed (Mbps) in the relay apparatus 30 are associated and managed.

Terminal Authentication Management Table

FIG. 9 is a conceptual diagram illustrating a terminal authentication management table. A terminal authentication management DB 5002 which includes a terminal authentication management table as shown in FIG. 9 is configured in the storage unit 5000. In this terminal authentication management table, a password for authentication is associated and managed for the respective terminal IDs of all of the terminals 10 managed by the call management system 50.

Terminal Status Management Table

FIG. 10 is a conceptual diagram illustrating a terminal status management table. A terminal status management DB 5003 which includes a terminal status management table as shown in FIG. 10 is configured in the storage unit 5000. In this terminal status management table, for each call ID of the respective call terminals 10 and the respective printing terminals 20, the type of the terminal; a destination name when the respective terminal is set to be a destination; an operating status of the respective terminal; a received date/time at which the below-described log-in request information is received by the call management system 50; and the IP address of the respective terminal. The terminal ID, the type of terminal, and the destination name are stored and managed when registering with the call management system 50 in order to conduct communication using the call system 1.

Destination List Management Table

FIG. 11 is a conceptual diagram illustrating a destination list management table. A destination list management DB 5004 which includes a destination list management table as shown in FIG. 11 is configured in the storage unit 5000. In this destination list management table, terminal IDs of destination terminals registered as a candidate for a communication counterpart are all associated with the terminal ID of a requestor terminal requesting a start of a call, and managed. The candidate for the communication counterpart is updated by adding or deleting in response to a request from an arbitrary requestor terminal to the call management system 50 to add or delete.

Moreover, a terminal ID of the printing terminal is registered in the destination list management table. This printing terminal is, for example, a printing terminal near a call terminal of a conference counterpart to which the conference counterpart can go and pick up the printed material and a call terminal to which a person in charge at the own location can go and pick up the printed material.

Session Management Table

FIG. 12 is a conceptual diagram illustrating a session management table. A session management DB 5005 which includes a session management table as shown in FIG. 12 is configured in the storage unit 5000. In this session management table, a relay apparatus ID of the relay apparatus 30 for use in relaying call data (image data and voice data); a terminal ID of a requestor terminal; a terminal ID of a destination terminal; a delay time (ms) of receipt when the image data are received at the destination terminal; and a received data/time at which delay time information indicating the delay time that is sent from the destination terminal is received at the call management system 50. When a call is conducted between the two call terminals 10, the received date/time of the delay time information may be managed based on the delay time information transmitted from the requestor terminal, not the destination terminal. When conducting the call among three or more call terminals 10, the received date/time of the delay time information are managed based on delay time information transmitted from the terminal 10 on the receiving side of the image data and the voice data.

The Respective Functional Configurations of Call Management System

Next, the respective functional configurations of the call management system 50 are described in detail. The transmitting/receiving unit 51, which is executed by the network I/F 509 shown in FIG. 5, and instructions from the CPU 501 shown in FIG. 5, conducts transmission and reception of various data (or information) with a different terminal, apparatus, or system via the communication network 2.

The terminal authentication unit 52, which is realized by instructions from the CPU 501 shown in FIG. 5, searches the terminal authentication management table with the terminal ID and the password included in the log-in request information received via the transmitting/receiving unit 51 as search keys and determines whether the same terminal ID and password are managed in this terminal authentication management table to perform terminal authentication.

The status management unit 53, which is realized by instructions from the CPU 501 shown in FIG. 5, stores and manages, in association in the terminal status management table, the terminal ID of the requestor terminal, the operating status of the requestor terminal, the received date/time at which the log-in request information is received at the call management system 50, and the IP address of the requestor terminal in order to manage the operating status of the requestor terminal from which the log-in request is made. Moreover, based on the status information to turn off power that is sent from the call terminal 10 or the printing terminal 20, the status management unit 53 changes the operating status indicating the terminal status management table as on-line is changed to offline.

The determination unit 54, which is realized by instructions from the CPU 501 shown in FIG. 5, determines whether the operating status indicated in the operating status information is "on-line". Moreover, when the determination unit 54 determines that it is "on-line", it determines that the operating status information can be transmitted to a predetermined call terminal 10 and, when it determines that it is not "on-line", determines that the operating status information cannot be transmitted to the predetermined call terminal 10.

The session management unit 55, which is realized by instructions from the CPU 501 shown in FIG. 5, stores and manages, in the session management table of the storage unit 5000 in association, a relay apparatus ID of the relay apparatus 30 for use in relaying the call data, a terminal ID of the requestor terminal, a terminal ID of the destination terminal, a delay time (ms) of receipt when the image data are received in the destination terminal, and received date/time at which the delay time information indicating the delay time that is sent from the destination terminal is received by the call management system 50. Moreover, the session management unit 55 creates a session ID for use in establishing a communication session.

The storage and reading processing unit 59, which is executed by the HDD 505 shown in FIG. 5, and instructions from the CPU 501 shown in FIG. 5, performs a process of storing various data in the storage unit 5000 and reading various data stored in the storage unit 5000.

Functional Configuration of Data Server

The data server 80 includes a transmitting/receiving unit 81; a viewing control unit 82; and a storage and reading processing unit 83. These respective units are functions or means realized by any of the respective constituting elements shown in FIG. 5 operating by instructions from the CPU 501 in accordance with programs for the data server that are developed on the RAM 503.

The transmitting/receiving unit 81, which is realized by the network I/F 509 shown in FIG. 5, and instructions from the CPU 501 shown in FIG. 5, conducts transmission and reception of various data (a screen shot, for example) with the call terminal 10 via the communication network 2.

The browsing control unit 82 controls a browsing request from the call terminal 10 for a screen shot stored in the screen shot DB 8001; For example, this is a web server.

The storage and reading processing unit 83, which is executed by the HDD shown in FIG. 5, and instructions from the CPU 501 shown in FIG. 5, performs a process of storing various data in the storage unit 8000 and reading various data stored in the storage unit 8000. A screen shot is registered in a folder with a terminal ID of the call terminal 10 which transmitted the screen shot as a folder name, and a screen shot is read from a folder with a terminal ID of the call terminal 10 which requested the screen shot as a folder name.

Moreover, the data server 80 configures the below-described screen shot DB 8001 in the storage unit 8000. The screen shot transmitted from the respective call terminals is stored in the screen shot DB 8001 for each call terminal.

Processing or Operation of the Embodiment

Figure 13:
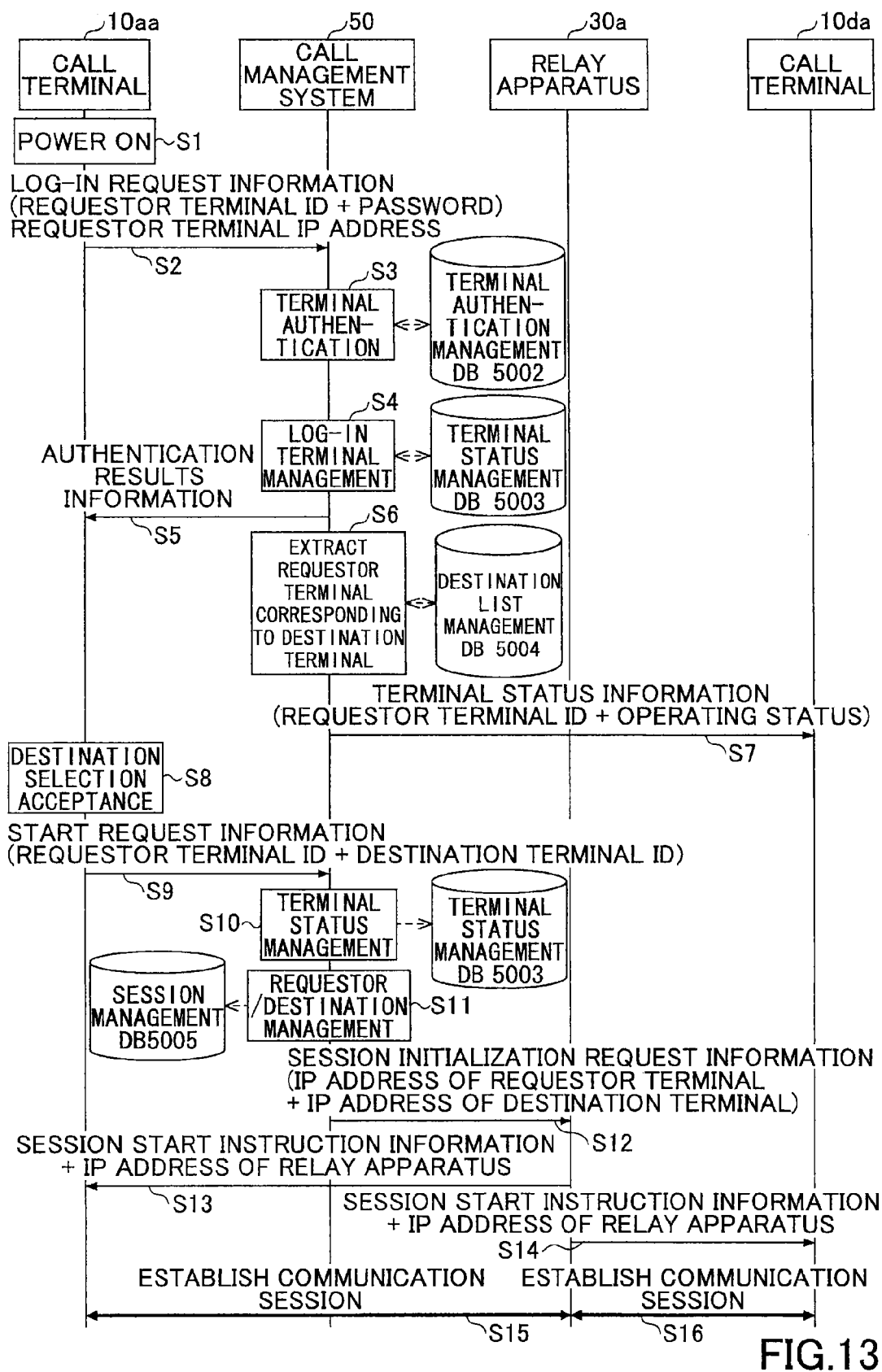
FIG. 13 is a sequence diagram illustrating a process of making preparations for starting the call between the call terminals and establishing a session.

Next, using FIG. 13, a processing or operation of the present Embodiment is described. FIG. 13 is a sequence diagram illustrating a process of making preparations for starting a call between call terminals and establishing a session.

S1: First, when the user (the person in charge) of the requestor terminal (the call terminal 10*aa*) turns ON the power switch 109, the operation input acceptance unit 12 accepts the power ON to turn ON the power of the call terminal 10.

S2: With the acceptance of the power ON as a trigger, the transmitting and receiving unit 11 transmits log-in request information indicating a log-in request to the call management system 50 via the communication network 2. This log-in request information includes a password and a terminal ID for identifying the terminal 10*aa*, which is the requestor terminal. The terminal ID and the password are data read from the storage unit 1000 via the storage and reading processing unit 19 to be sent to the transmitting/receiving unit 11. When the log-in information is transmitted from the requestor terminal (the terminal 10*aa*) to the call management system 50, the call management system 50, which is the receiver, may grasp the IP address of the terminal 10*aa*, which is the transmitter. Moreover, the log-in request may be set with not the power on, but input of user instructions as a trigger. Furthermore, it may be arranged for the user to be able to input the terminal ID and the password to the requestor terminal.

S3: Next, with the terminal ID and the password that are included in the log-in request information received via the transmitting and receiving unit 51 as search keys, the terminal authentication unit 52 of the call management system 50 performs terminal authentication by determining whether the same terminal ID and the same password are managed in this terminal authentication table.

S4: When it is determined by the terminal authentication unit 52 to be a log-in request from the call terminal 10 having a valid usage privilege since the same terminal ID and the same password are managed, the status management unit 53 stores, in association in the terminal status management table, an operating status; received date/time at which the log-in request information was received; and the IP address of the terminal 10*aa* for each record indicated by the destination name, the type of the terminal, and the terminal ID of the call terminal 10*aa*.

S5: Then, the transmitting/receiving unit 51 of the call management system 50 transmits authentication results information indicating authentication results obtained by the terminal authentication unit 52 via the communication network 2 to the requestor terminal (the call terminal 10*aa*) which made the log-in request.

S6: The storage and reading processing unit 59 of the call management system 50 searches the destination list management table based on the terminal ID "01aa" of the requestor terminal (the call terminal 10*aa*) which made the log-in request to extract the terminal ID of a different requestor terminal which registers, as a candidate of a communication counterpart, a terminal ID "01aa" of the requestor terminal (call terminal 10*aa*). Here, for brevity and simplicity of explanations, a case is described below in which the terminal ID extracted in step S6 is a terminal ID "01da" of the call terminal 10*da*.

S7: Next, the transmitting/receiving unit 51 transmits, to the terminal 10*da*, "the status information of the terminal" including operating status information indicating the operating status of the requestor terminal (the call terminal 10*aa*) and the terminal ID "01aa" of the requestor terminal (the call terminal 10*aa*). In this way, the transmitting and receiving unit 11 of the call terminal 10*da* receives status information of the terminal 10*aa*.

Thereafter, the terminal 10*aa* requests, to the call management system 50, the destination terminal ID registered in the destination list management table to obtain the operating status of the respective terminals and destination list information (terminal ID, destination name). The display control unit 16 of the terminal 10*aa* displays, on the display 508, a destination list screen (not shown) which displays, in a listing, a destination list.

S8: When the user selects a destination terminal with which a call is started from the listing of the destination list, the operation input acceptance unit 12 accepts a request for starting a call with the destination terminal (the call terminal 10*db*).

S9: The transmitting and receiving unit 11 of the requestor terminal (the call terminal 10*aa*) transmits, to the call management system 50, start request information which includes a terminal ID "01aa" of the requestor terminal (call terminal 10*aa*) and a terminal ID "01da" of the destination terminal (call terminal 10*da*) and which indicates a desire to start a call. In this way, the transmitting and receiving unit 51 of the call management system 50 may receive an IP address "1.2.1.3" of the requestor terminal (the call terminal 10*aa*), which is the transmitter, and the start request information.

S10: Then, based on the terminal ID "01aa" of the requestor terminal (call terminal 10*aa*) and the terminal ID "01da" of the destination terminal (call terminal 10*da*) that are included in the start requestor information, the status management unit 53 changes, from "on-line (call possible)" to "on-line (call ongoing)", an operating status field portion of records respectively containing the terminal ID "01aa" and the terminal ID "01da".

S11: Next, the session management unit 55 stores and manages, in association in the session management table of the storage unit 5000, the relay apparatus ID "111a" of the relay apparatus 30*a* used, the terminal ID "01aa" of the requestor terminal (the call terminal 10*aa*) and the terminal ID "01da" of the destination terminal (the call terminal 10*da*). Then, the relay apparatus 30*a* with an IP address which is close to the IP address of the requestor terminal (the call terminal 10*aa*) is selected, for example.

S12: Next, the transmitting and receiving unit 51 of the call management system 50 transmits session initialization request information to the delay apparatus 30*a*. In this way, the relay apparatus 30*a* receives session initialization request information. This session initialization request information, which is an instruction which initializes a communication session of the relay apparatus 30, includes an IP address "1.2.1.3" of the requestor terminal (the call terminal 10*aa*) and an IP address "1.3.2.3" of the destination terminal (the call terminal 10*da*). The respective IP addresses are IP addresses respectively corresponding to the terminal ID of the requestor terminal (the call terminal 10*aa*) and the terminal ID of the destination terminal (the call terminal 10*db*).

S13: Next, the relay apparatus 30*a* transmits session start instruction information to the requestor terminal (the call terminal 10*aa*) based on the IP address "1.2.1.3" of the requestor terminal (the call terminal 10*aa*) that was received in step S12. This session start instruction information is an instruction for the requestor terminal (the call terminal 10*aa*) to start the communication session. Moreover, at this time, the IP address "1.2.1.2" of the relay apparatus 30*a* is also transmitted.

S14: Similarly, the relay apparatus 30*a* transmits session start instruction information to the destination terminal (the call terminal 10*da*) based on the IP address "1.3.2.3" of the destination terminal (the call terminal 10*da*) that was received in step S12. This session start instruction information is an instruction for the destination terminal (the call terminal 10*da*) to start the communication session. Moreover, at this time, the IP address "1.2.1.2" of the relay apparatus 30*a* is also transmitted.

S15: In this way, a first communication session sed1 is established between the requestor terminal (the call terminal 10*aa*) and the relay apparatus 30*a*.

S16: Moreover, a second communication session sed2 is established between the destination terminal (the call terminal 10*da*) and the relay apparatus 30*a*.

In this way, a call is started between the requestor terminal (the call terminal 10*aa*) and the destination terminal (the call terminal 10*da*), so that a display screen as shown in I in FIG. 15 is displayed on a display 120 of the destination terminal (the call terminal 10*da*) and on the requestor terminal (the call terminal 10*aa*).

Permission to Capture Image Data of Personal Verification Document

A personal verification document is a document which can only be obtained and/or held by the person himself in principle and is a document which proves that whoever holds the document is probably the person himself. Generally, the personal verification document has described therein personal information of the person himself. The personal information includes the name, the birthdate, a current address, a temporary residence, the permanent domicile, a telephone number, a photograph of the face, a vehicle number, a personal identification number, etc. Moreover, documents in which the personal information is described include a driver's license, an insurance certificate, a passport, a certificate of residence, a copy of family register, etc. The personal verification document may be a card instead of paper. Moreover, while image data of an imaged image for the personal verification document is described as an example of an image which requires a capture permission in the present Embodiment, it is not limited thereto, so that it may be arranged to require permission when the call terminal 10 captures image data of a confidential document in which highly confidential information is described. In addition, it may be arranged to require permission for the call terminal 10 to capture image data containing information for which storage thereof without permission of the customer is not desired.

Figure 14:
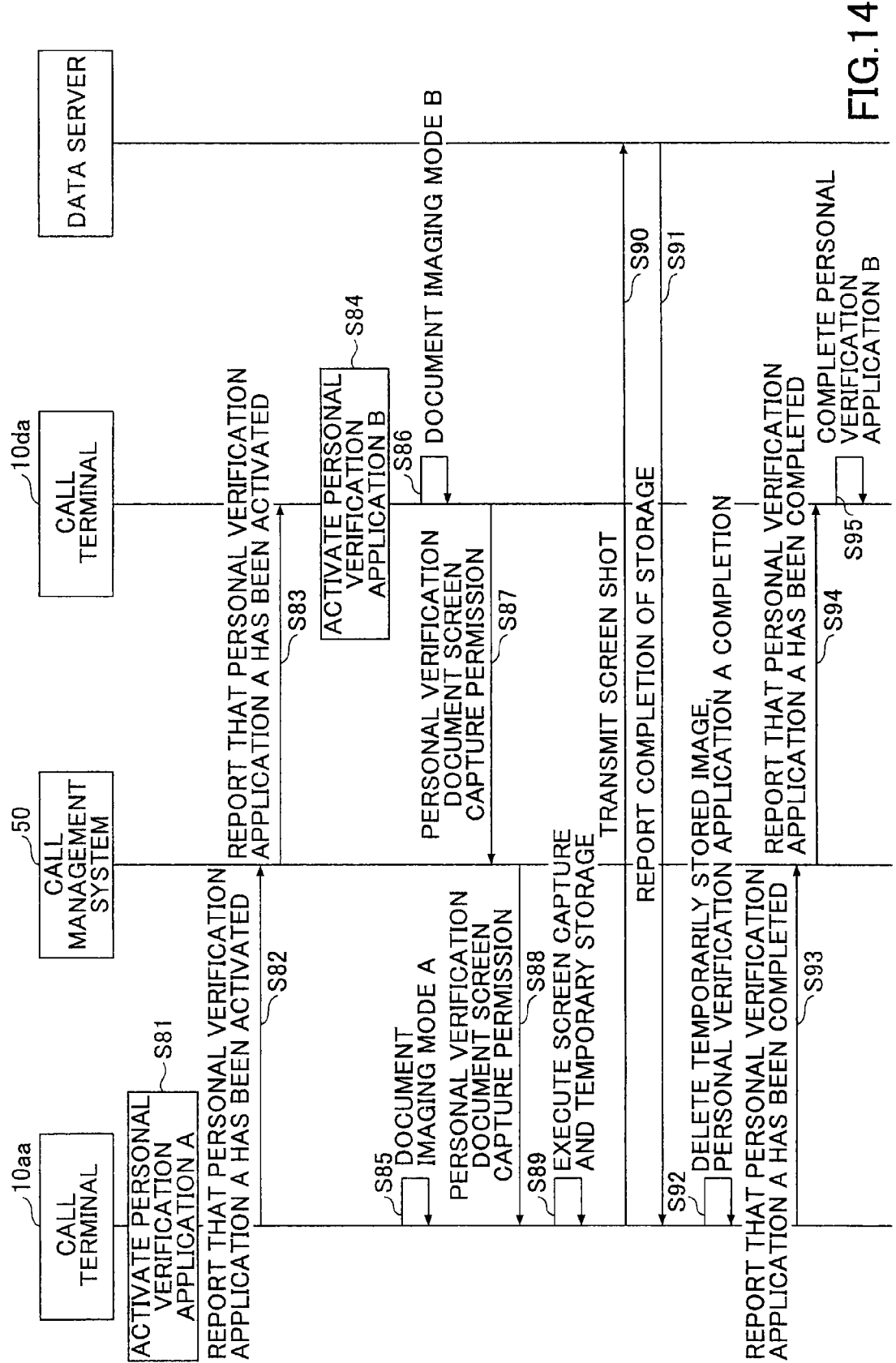
FIG. 14 is one example of a sequence diagram illustrating a procedure for a communication terminal 10aa to perform imaging of image data transmitted from a communication terminal 10da.

FIG. 14 is one example of a sequence diagram illustrating a procedure for the call terminal 10*aa* to image data transmitted from the call terminal 10*da*. FIG. 15 is one example of a drawing for schematically explaining a procedure of capturing a display screen by personal verification applications A and B. A remote conference is being conducted between the call terminal 10*aa* on the head office side and the call terminal 10*da* on the customer side. Assume that there are only two call terminals which establish a session.

As shown in I(a) and I(b) in FIG. 15, before capturing the display screen, the call terminals 10*aa* and 10*da* are in a regular conference mode. In the regular conference mode, which is a mode in which image data imaged by a camera of the respective call terminals conferencing are mutually transmitted and received, so that a person in charge or a customer may set up a layout of a display screen of the display 120. In the regular conference mode, layouts as follows are possible:

Full screen (counterpart image) mode

PandP mode (participating locations including the own location are arranged in the same size)

PinP mode (the own video is displayed in a small size on the lower right of the PandP mode, which does not include the own location)

Multi-view mode (With a counterpart video as a main one, video of the remaining locations (including the own location) is displayed on the right, bottom, and left sides thereof)

I(a) and I(b) in FIG. 15 are both PinP modes.

S81: The person in charge presses a predetermined button 1205 of the call terminal 10*aa* for activating the personal verification application A (for head office). In this way, the operation input acceptance unit 12 accepts an operation which activates the personal verification application A and the call terminal 10*aa* activates the personal verification application A. The personal verification application A instead of the predetermined button may be activated by the person in charge selecting an icon thereof that is displayed on the display 120.

S82: The activated personal verification application A reports to the call management system 50 via the transmitting/receiving unit 11 that it has been activated.

S83: The transmitting/receiving unit 51 of the call management system 50 reports that the personal verification application A has been activated to the call terminal 10*da*, which is a counterpart terminal of the communication terminal 10*aa* that is registered in the session management table.

S84: The transmitting/receiving unit 11 of the call terminal 10*da* receives a report that the personal verification application A was activated at the call terminal 10*aa* and the call terminal 10*da* activates the personal verification application B.

S85: The personal verification application A sets the call terminal 10*aa* to a document imaging mode A. As shown in II(a) in FIG. 15, in the document imaging mode A, the display control unit 16 displays, on the display 120 in full screen, image data transmitted from the call terminal 10*da*. The display screen cannot be captured until a permission to capture is transmitted from the call terminal 10*da*. In other words, the person verification application A and the call terminal 10*aa* does not include a user interface for capturing image data, such as a button. Even when the call terminal 10*aa* includes a user interface for capturing image data, such as a button, an operation of such a button is ignored when the personal verification application A is ignored.

S86: When the personal verification application B is activated in the call terminal 10*da*, it sets the call terminal 10*da* to a document imaging mode B. As shown in II(b) in FIG. 15, in the document imaging mode B, the display control unit 16 displays an own video on a display 120*da* in full screen. Moreover, it displays a guide frame 1201 for providing a personal verification document. The personal verification document varies in size depending on the type thereof, so that the person in charge at the head office may instruct the type of personal verification document (the driver's license, the insurance certificate, the passport, the certificate of residence, the copy of the family register, etc.) in order to display the guide frame 1201 in an appropriate size. The personal verification application A reports the type of the personal verification document or the size of the guide line to the personal verification application B, making it possible to display a guide frame appropriate for the size of the personal verification document.

Moreover, the personal verification application B displays a dialog which directs the personal verification document such as to image it with a camera connected to the call terminal 10*da*. In the dialog shown, it is displayed that "please align the personal verification document with a blue quadrilateral to push decide".

The customer on the call terminal 10*da* side images the personal verification document with a camera of the call terminal 10*da* in accordance with instructions. As shown in III(b) in FIG. 15, image data of the personal verification document are displayed in a full screen mode on the display 120da of the call terminal 10da.

In this way, the transmitting and receiving unit 11 starts to transmit the image data of the personal verification document to the call terminal 10aa. The starting of the transmission does not mean that capturing has been permitted; until the customer provides the permission, the display control unit 16 of the call terminal 10aa applies an image process (indicating NoCopy, a mosaic process, a luminance reduction process, a contrast reduction process, etc., for example) to the image data of the personal verification document such as to cause the personal information to be no longer legible.

As shown in III(a) in FIG. 15, image data of the personal verification document are displayed in a full screen mode in the display 120aa of the call terminal 10aa. However, the image data of the personal verification document cannot be captured until the customer permits. Moreover, with an indication of NoCopy, the personal information is not recorded even with a digital camera, etc.

S87: The in charge person at the head office views the image data of the personal verification document that are displayed on the display 120aa of the call terminal 10aa to check the imaging quality and requests the customer for a permission to capture the screen shot, and, if permissible, instructs by voice to push the decide button (alternatively, a message requesting a permission to capture it may be displayed on a dialog.) The customer at the call terminal 10da pushes the decide button 1202. Pushing of this decide button 1202 corresponds to the permission to capture. The personal verification application B transmits, by the transmitting/receiving unit to the call management system 50, the permission to capture and the image data of the personal verification document. Pressing the decide button includes pressing the "hard" button, touching the decide button on a touch panel, clicking the decide button with a mouse, gesture inputting, a voice operation (for example, uttering "permission to capture"), etc.

Therefore, the inquiry unit 18b of the present Embodiment operates as follows:

When the person in charge requests for a permission to capture by voice, the inquiry unit 18b is not needed.

When the person in charge requests for the permission to capture on a dialog, pressing a button, etc., of the call terminal 10aa that is operated by the person in charge for causing the dialog to be displayed on the call terminal 10da becomes a trigger for the request for the permission. Therefore, with pressing of the button that causes the dialog to be displayed.

When the personal verification application B is activated upon activating the personal verification application A, and the dialog for requesting the permission for capturing is automatically displayed by the personal verification application B, pressing of a predetermined button 1205 for the personal verification application A becomes a trigger for requesting the permission. Therefore, with pressing of the predetermined button 1205, the inquiry unit 18b inquires the call terminal 10da.

S88: The call management system 50 transmits, to the call terminal 10aa, the permission to capture and the image data of the personal verification document to the call terminal 10aa.

S89: With pressing of the decide button of the call terminal 10da, the call terminal 10aa receives the permission to capture, the capture unit 14 of the call terminal 10aa captures the display screen displayed on the display 120aa to temporarily store the screen shot in an image saving DB1001 of the call terminal 10aa. In other words, even when the person in charge does not operate at all, the capture unit 14 of the call terminal 10aa creates a screen shot on the display screen. It may also be arranged that, upon receiving the permission to capture, the personal verification application A may effectuate the creation operation of the screen shot in the call terminal 10aa. The display control unit 16 does not perform the image process which causes the personal information to be no longer legible on image data transmitted with the permission to capture. The capture unit 14 captures the image data, making it possible to store image data with personal information imaged in a superior manner.

S90: The temporarily stored screen shot is automatically transmitted to the data server 80 of the head office. More specifically, the data registration unit 18d transmits the screen shot stored in the image storage DB 1001 to the data server 80 by the transmitting/receiving unit 11. At the time of registration, the storage and reading processing unit 83 of the data server 80 links the screen shot to at least the terminal ID to register the linked results to the screen shot DB 8001. The registration is described below in detail.

S91: The data server 80 transmits the storage completion to the call terminal 10aa. It may also be arranged to have a procedure to transmit the screen shot from the call terminal 10aa to a designated printing machine and print the transmitted results, which procedure is described below.

S92: Upon receiving the report on the storage completion, the personal verification application A of the call terminal 10aa deletes the screen shot temporarily stored. The person in charge presses the predetermined button 1205 of the call terminal 10aa to complete the personal verification application A. Moreover, it may be arranged for the person in charge to press a predetermined button 1205 of the call terminal 10aa, so that the personal verification application A is completed, and for the personal verification application A to delete the screen shot at the time of completion.

S93: The call terminal 10aa transmits to the call management system 50 that the personal verification application A has been completed. This transmission may be made by the personal verification application A immediately before completion of the application.

S94: The call management system 50 reports the call terminal 10da that the personal verification application A has been completed.

S95: The personal verification application B of the call terminal 10da is automatically completed by a report that the personal verification application A has been completed. In other words, when the personal verification application B is being activated, the document imaging mode B cannot be completed from the call terminal 10da. In this way, completion of the personal verification application B due to an erroneous operation of the customer may be prevented. Moreover, when the personal verification application B is being activated, only the decide button 1202 can be pressed with the other keys being locked by the operation input acceptance unit 12 (an operation other than that of the decide button 1202 is ignored). In other words, when the personal verification application B is being activated, a process other than a transmission of image data of the personal verification document is prohibited.

When the call terminal 10aa and the call terminal 10da respectively complete the personal verification applications A and B, the call terminals 10aa and 10db return to the regular conference mode, and returns to the layout (I(a) and I(b) in FIG. 15) before turning to the document imaging modes A and B.

In this way, it suffices for the customer transmitting image data of the personal verification document to just press the decide button with the personal verification document in alignment with the guide frame, so that even a customer who is not used to operating may easily transmit image data of the personal verification document. In other words, activation and completion of the personal verification application B, transmission process of the image data of the personal verification document, etc., are not required.

While the call terminal 10*aa* stores a still image as image data in the present Embodiment, it may be arranged to store a video in which the personal verification document is imaged. Moreover, at this time, it may be arranged for voice data in which vocal confirmations are made on the customer side to be the permission for capturing the personal verification document. In other words, image data and voice data in which the customer utters "agrees to storing the driver's license", etc., are stored. In this case, even when the decide button is pressed on the side of the person in charge, the image data and the voice data may be set to be records of the permission to capture. Moreover, performing voice recognition and transmitting of the permission to capture to the call terminal 10*aa* by the call management system 50 makes it possible to make pressing of the decide button 1202 unnecessary.

Moreover, while the call terminals 10*aa* and 10*da* communicate via the call management system 50 in FIG. 14, the call terminals 10*aa* and 10*da* may directly communicate with the call management system 50 not intervening, or with minimal intervention of the call management system 50.

When the Personal Verification Document Includes Multiple Pages

Next, a case in which the personal verification document includes multiple pages is described using FIG. 16. FIG. 16 is one example of a sequence diagram illustrating a procedure for the call terminal 10*aa* to image, multiple times, image data transmitted from the call terminal 10*da*. With a specification which only involves pressing the decide button 1202 for simplifying the customer operation, the call terminal 10*aa* cannot determine whether the personal verification applications A and B may be completed when the decide button corresponding to what number of pages is pressed when there are multiple pages in the personal verification document. For example, with the driver's license, it may be desired to image a back face, requiring capturing at least twice. Moreover, there may also be a procedure in which the personal verification documents of different types are requested.

The person in charge knows how many captures are needed; however, the captures are not possible with an operation of the person in charge, making it difficult to control the number of captures. While the person in charge may count the number of times of pressing of the decide button by the customer (the number of screen shot sheets captured), it is difficult to check the pressing of the decide button since the customer is located in a remote location.

Thus, the person in charge sets, in the personal verification application A, the number of times of capture, at the time of or after activating the person verification application A. In this way, when the permission to capture is received the set number of times of capture, the personal verification application A may complete it. Below, only major steps in FIG. 16 are described.

S81-1: The person in charge sets the number of times of capture, so that the operation input acceptance unit 12 accepts the number of times of capture. For example, the personal verification application A displays a menu such as "one time mode", "two time mode", "three time mode", and accepts a selection of the person in charge.

S82: In step S82, the number of times of capture may be set when reporting, to the call management system, that the personal verification application A has been activated. In this case, the personal verification application B may press the decide button only the reported number of times of capture. The number of times the personal verification document is stored is restricted, so that the customer may press the decide button with security.

S87 to S89: The capture unit 14 of the call terminal 10*aa* captures an image displayed on the display 120*aa*.

S87-1 to S89-1: The same steps as in S87 to S89 are executed. The same steps as in S87 to S89 are repeated the number of times of capture, while FIG. 16 shows twice.

S89-2: The personal verification application A makes a final determination as to whether the permission to capture is received the number of times of capture. When the permission to capture is received the number of times of capture, registration to the data server 80 is performed. The subsequent process is the same as in FIG. 14.

Therefore, when the capture is completed the number of pages of the personal verification document, personal verification application B may be completed in steps S93 to S95. Even in this case, the customer may permit capturing of the personal verification document with an operation in which the decide button is pressed the number of pages of the personal verification document.

As described above, the call terminal 10*aa* on the head office side cannot capture the display screen unless an agreement of the customer is obtained, storing of image data not desired for saving by the customer is prevented.

The modes of the present Embodiment do not limit the scope of the present invention, so, needless to say, there are various system configuration examples depending on the use and objectives. For example, the call management system and the data server 80 may be arranged as one information processing apparatus. Moreover, the printing terminal 20 may include functions of the call management system 50 and the data server 80.

Moreover, the function included by the call management system 50 may be included by multiple information processing apparatuses in a distributed manner, while the function included by the data server 80 may be included by multiple information processing apparatuses.

Moreover, the determination unit 17*a*, the transformation unit 17*b*, and the destination list creation unit 18*a* of the call terminal 10 may be included in the call management system 50, the data server 80, or the call terminal 10. It is not necessary for the other functions included in the call terminal 10 to be embedded in the call terminal, so that the call terminal may call and use them.

Moreover, the storage unit 5000 included in the communication management system 50 may be on a network accessible by the communication management system 50; the storage unit 8000 included in the data server 80 may be on a network accessible by the data server 80; the storage unit 2000 included in the printing terminal 20 may be on a network accessible by the printing terminal 20; and the call terminal 10 may be a network accessible by the call terminal 10.

Embodiment 2

In the present Embodiment, an explanation is given of capturing personal verification documents when the call terminal 10*aa* is making a call with multiple call terminals

10da, 10db, and 10ca. While there are not many cases in which the personal verification documents are received at once from multiple call terminals to capture the received results, for a conference, it is convenient since it is often desired to capture documents, minutes, etc., used by the respective participants.

Display Screen of Display 120

A display screen displayed on the display 120 of the communication terminal 10aa is described. When at least three call terminals 10 are in a conference, the respective call terminals may display image data transmitted by a counterpart terminal on one display 120.

Figure 17A:
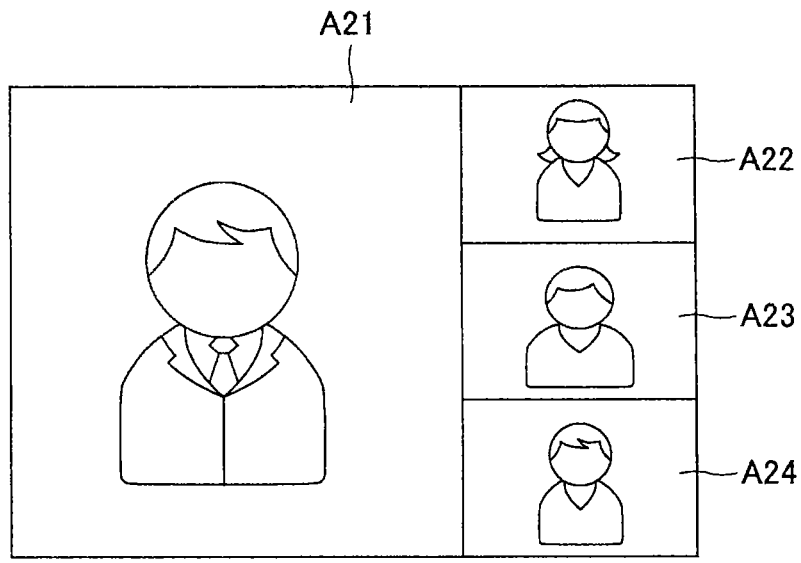
FIGS. 17A and 17B are diagrams illustrating one example of a display screen which is displayed on a display of the call terminal 10aa.

FIG. 17A is a diagram illustrating one example of a display screen which is displayed on the display 120 of the call terminal 10aa. FIG. 17A shows an example in which a screen is divided into four areas A21-A24 as a multi-view mode. A large area (a first display area) from the left portion of the screen to the center is a display area A21; while small areas (second display areas) from the upper right portion of the screen to the lower-right are respectively display areas A22 to A24.

The correspondence between the respective image data sets and the areas are determined by the display control unit 16, for example, based on predetermined rules. An area in which image data of an own terminal is displayed is a lower-right area A24, for example. Moreover, image data transmitted by the call terminal 10 (a call terminal with the maximum voice level) in which a conference participant is making an utterance toward the microphone 115 are assigned to the display area A21, for example. For the other areas, the correspondence with the call terminals are determined based on an order in which a session is established, for example.

The respective call terminals 10 determine which call terminal the received image data are received from. When relaying the image data, the relay apparatus 30 recognizably transmits, to the respective call terminals, which call terminal the image data are transmitted from. Therefore, the image data and the terminal ID may be linked.

The display control unit 16 of the call terminal 10aa manages the area and the image data displayed in the respective areas that are linked. FIG. 18 is a diagram illustrating one example of an area-terminal correspondence table managed by the display control unit 16. In the area-terminal correspondence table, the area and the terminal ID of the call terminal are registered in association. The terminal IDs (01da, 01db, 01ca) of the call terminal are registered for each area of A21 to A23. The area correspondence table is stored in the storage unit 1000 and updated each time the layout is changed.

Figure 19:
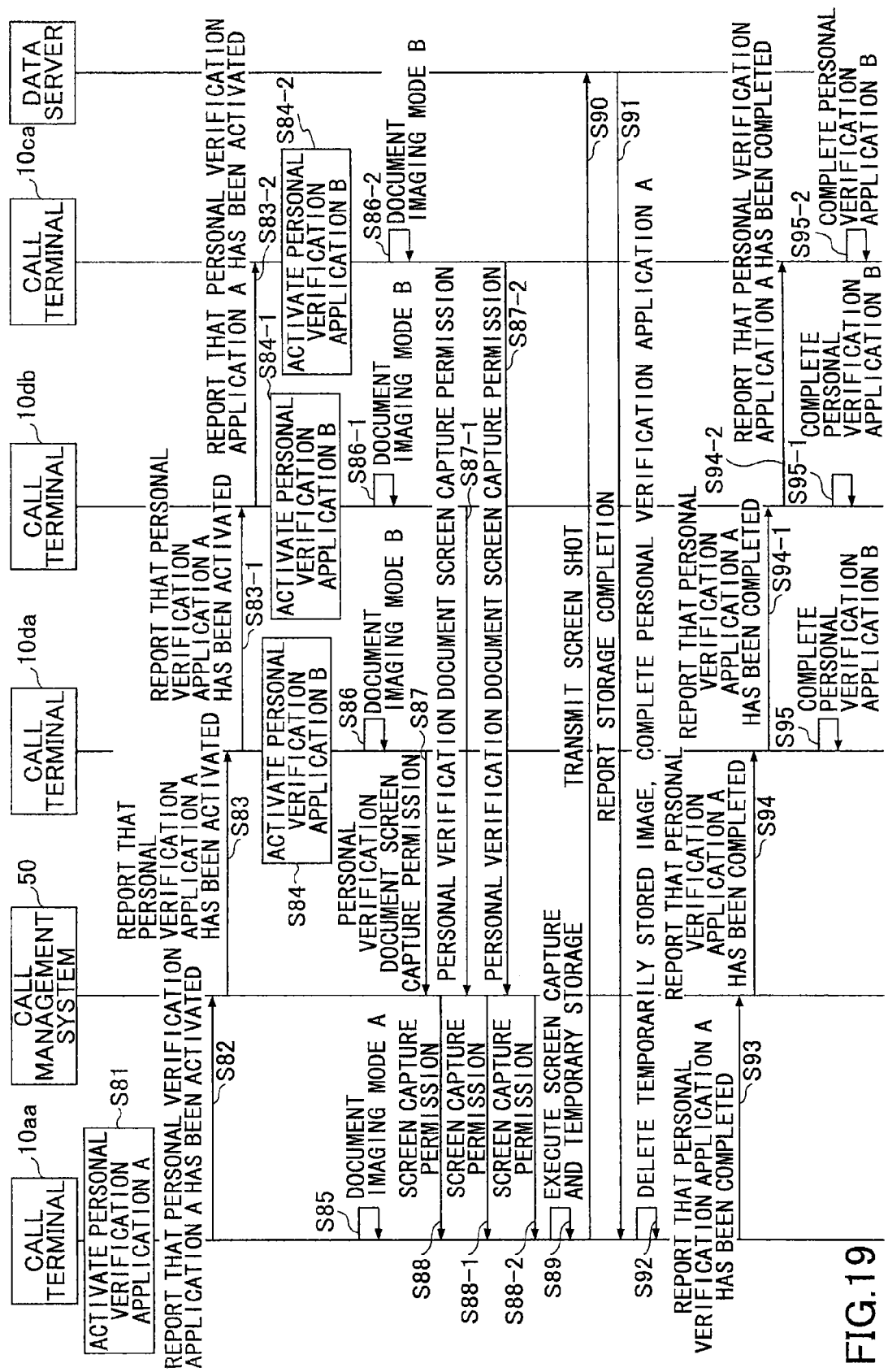
FIG. 19 is one example of a sequence diagram illustrating a procedure for the communication terminal 10aa to perform imaging of image data transmitted from communication terminals 10da, 10db, and 10ca.

FIG. 19 is one example of a sequence diagram illustrating a procedure for the communication terminal 10aa to perform imaging of image data transmitted from the communication terminals 10da, 10da, and 10ca. For FIG. 19, an explanation is given of major parts of the present Embodiment relative to FIG. 14.

S81: The person in charge presses a predetermined button of the call terminal 10aa for activating the personal verification application A (for head office). The call terminal 10aa activates the personal verification application A.

S82: The activated personal verification application A reports, to the call management system 50 via the transmitting/receiving unit 11, that it has been activated.

S83 to S83-2: The transmitting/receiving unit 51 of the call management system 50 reports, to all the call terminals (10da, 10db, 10ca) registered in the session management table, as counterpart terminals of the communication terminal 10aa, that the personal verification application A has been activated.

S84 to S84-2: The transmitting/receiving unit 11 of the call terminals 10da, 10db, and 10ca receive a report that the personal verification application A has been activated at the call terminal 10aa and the call terminals 10da, 10db, and 10ca activate the personal verification application B.

Figure 17B:
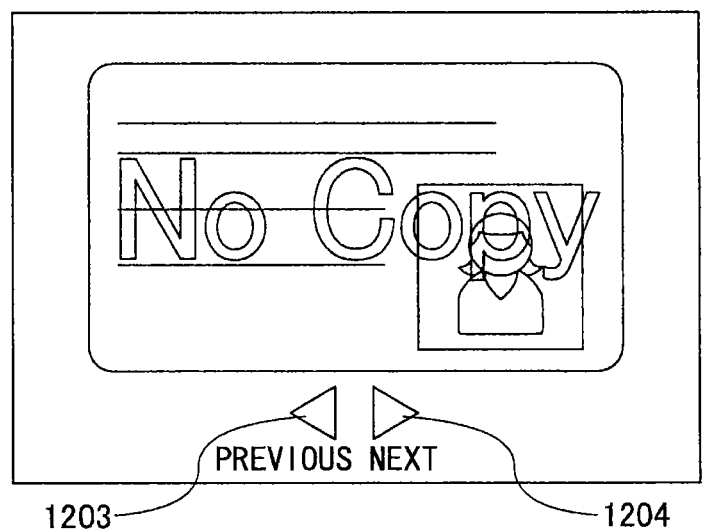

S86 to S86-2: When the personal verification application B is activated in the call terminals 10da, 10db, and 10ca, it sets the call terminals 10da, 10db, and 10ca to a document imaging mode B. In other words, the call terminals other than the call terminal 10aa turn to the document imaging mode B. When the respective customers align the personal verification document to the guide frame, the image data of the personal verification document are displayed on the display 120 of the call terminal 10aa as shown in FIG. 17B. In the call terminal 10aa, the image data of the personal verification document is displayed in a full-screen mode. In the same manner as Embodiment 1, letters of "No copy" are displayed in an overlaid manner. In the full screen mode, only one image data set may be displayed simultaneously, so that the person in charge may select "Previous" button 1203 or "Next" button 1204 to display an arbitrary personal verification document. Alternatively, when the call terminal 10aa is in a conference with multiple call terminals, the areas A21 to A24 may be kept in a divided manner.

S87 to S87-2: The customer of the call terminals 10da, 10db, 10ca aligns the personal verification document to the guide frame to press the decide button. Pressing of this select button corresponds to the permission to capture. The personal verification application B transmits, by the transmitting/receiving unit 11 to the call management system 50, the permission to capture and the image data of the personal verification document.

S88 to S88-2: The call management system 50 transmits, to the call terminal 10aa, the permission to capture and the image data of the personal verification document to the call terminal 10aa.

S89: With pressing of the decide button of the call terminals 10da, 10db, and 10ca, the call terminal 10aa receives the permission to capture, and the capture unit 14 of the call terminal 10aa captures an image displayed on the display to temporarily store the screen shot in an image saving DB1001 of the call terminal 10aa. The display 120 of the call terminal 10aa is in a full-screen mode, so that capture is successively conducted from the image data for which the permission to capture has been received. For a multi-mode layout, when a permission to capture is received from all of the call terminals 10da, 10db, and 10ca, the screen is captured, after which it is divided for each area. The subsequent process is the same as in Embodiment 1.

When there is a call terminal which does not transmit a permission to capture, a timeout is assumed upon an elapse of a predetermined time period after transmitting a report that the personal verification application A has been activated. In this case, image data of the call terminal which has undergone the timeout.

A call system 1 of the present Embodiment makes it possible to obtain permissions at once from multiple call counterparties to capture image data of a personal verification document. As a person in charge, the personal verification application A may only be launched once to capture multiple image data sets, making it possible to efficiently obtain a screen shot of a personal verification document.

Embodiment 3

In the present Embodiment, a procedure for registering, with the data server 80, a screen shot of a personal verification document captured by the call terminal 10aa and a procedure for printing are described.

While the screen shot which was captured by the call terminal 10aa in step S89 of FIG. 14 is automatically registered with the data server in the Embodiment 1, it may be registered with the data server 80 and printed by an operation of the person in charge.

FIG. 20 is a diagram illustrating one example of a process selection screen displayed on the display 120. The process selection screen is displayed upon the call terminal 10aa capturing the display screen. On the process selection screen are displayed a message "what do you like to do with captured image"; a "print" button 1211; a "transmit to server" button 1212; and a "cancel" button 1213. The person in charge selects either one of the buttons by clicking it with a mouse or touching it.

Figure 21:
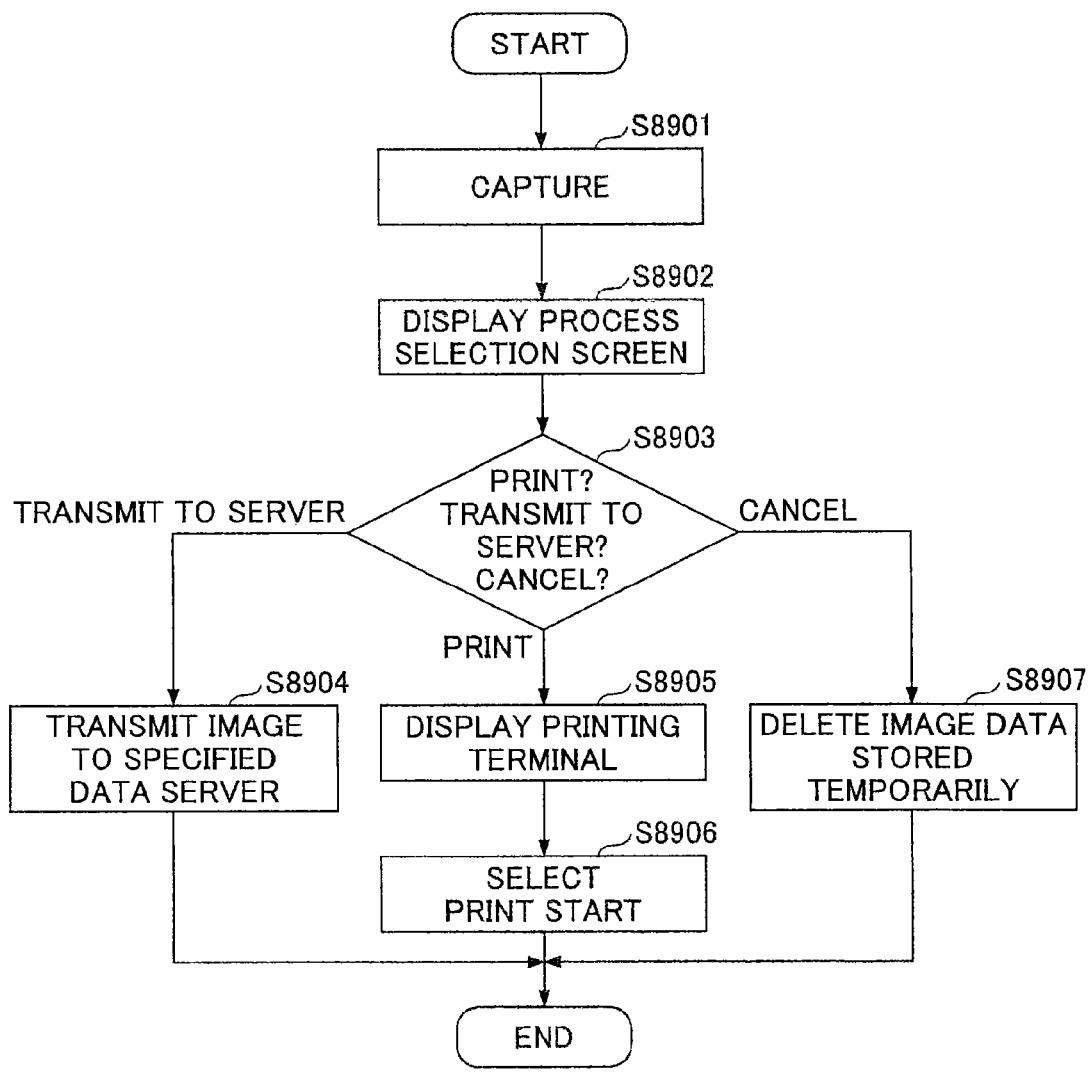
FIG. 21 is an exemplary flowchart for explaining a procedure for the call terminal 10aa to process a screen shot.

FIG. 21 is an exemplary flowchart for explaining a procedure for the call terminal 10aa to process a screen shot.

As described previously, the personal verification application A captures the personal verification document (S8901).

The personal verification application A displays a process selection screen as shown in FIG. 20 on the display 120 (S8902).

The personal verification application A determines which operation of "print", "transmit to server", or "cancel" was accepted by the operation input acceptance unit 12 (S8903).

When the transmit to server button 1212 is selected, the personal verification application A transmits the screen shot to the data server 80 via the communication network from the terminal (S8904). The transmitted screen shot is deleted from the call terminal 10aa.

When the print button 1211 is selected, the personal verification application A displays the printer list screen as shown in FIG. 20 (S8905). In the printer list screen, a list of printable printing terminals 20 which are registered with destination list information 1003 is displayed. The printed screen shot is deleted from the call terminal 10aa. The printer list screen as shown in FIG. 20 is described below.

When the person in charge selects the print start, the personal verification application A transmits the screen shot to the selected printing terminal (S8906). The printing procedure is as described below.

When the cancel button 1213 is selected, the personal verification application A deletes the screen shot temporarily stored in the image storage DB 1001 (S8907).

Registration to Data Server

Figure 22A:
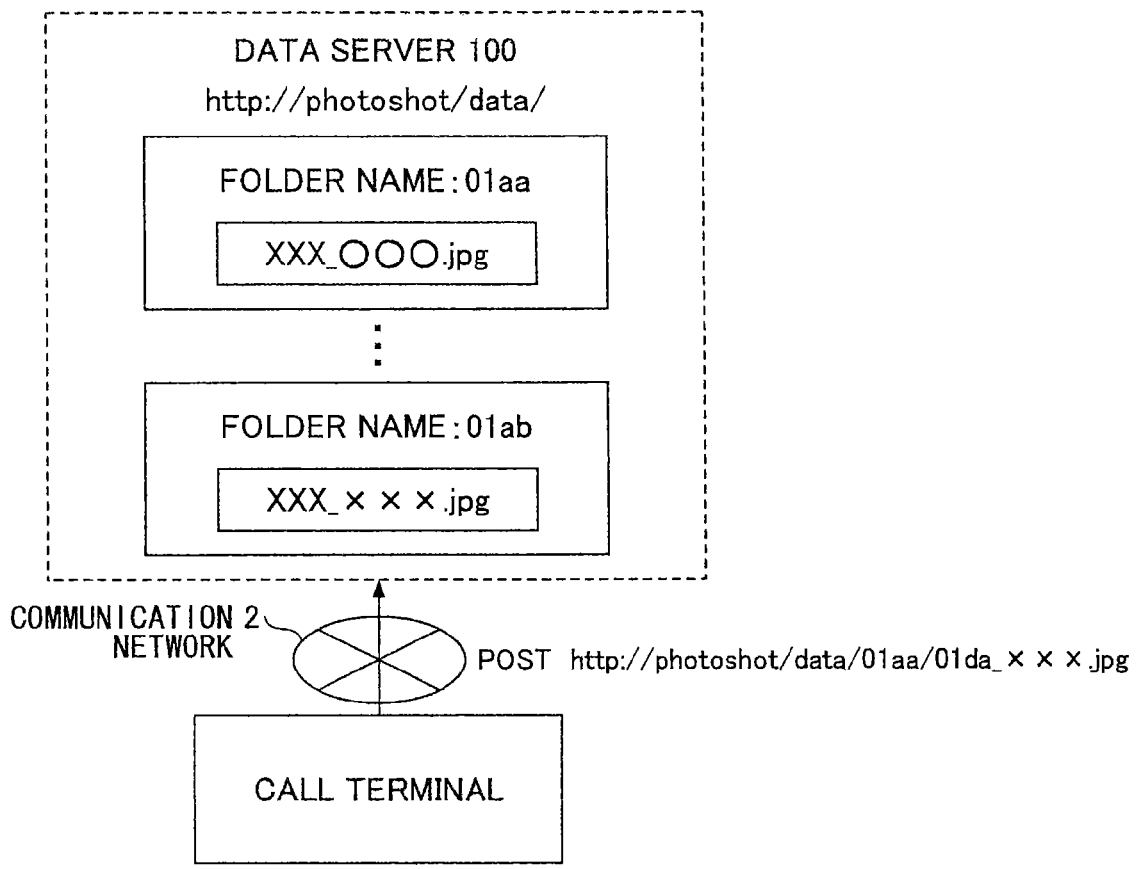
FIGS. 22A and 22B are exemplary diagrams for schematically explaining registration of the screen shot with the data server from the call terminal 10aa.
Figure 22B:
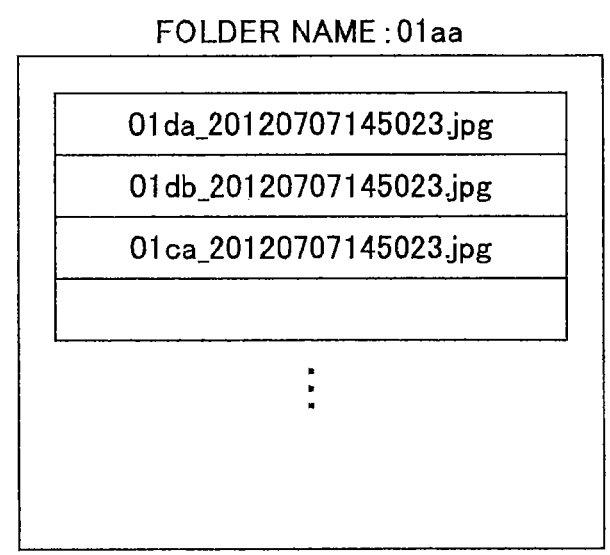

FIG. 22A is a diagram for schematically explaining registration of the screen shot from the call terminal 10aa to the data server 80. FIG. 22B is an exemplary diagram for explaining a file name of the screen shot stored in a folder.

A data registration unit 18d of the call terminal 10 transmits a terminal ID of the call terminal 10 by a login, etc., and the screen shot to the data server 80. The data registration unit 18d transmits a screen shot file (01da_XXX.jpg) with an HTTP POST command.

The data registration unit 18d gives a file name, in accordance with a predetermined rule, to the screen shot to be transmitted. The screen shot file name is generated so as to include a character sequence of "a terminal ID" and "a date". The terminal ID is a terminal ID of the call terminal 10 which transmitted the image data of the personal verification document, while the date is obtained from a clock embedded in the call terminal.

For example, when the image data of the personal verification document transmitted from the terminal ID "01da" is captured at "2012/7/7 14:50 23 seconds", the file name of the screen shot is "01da_20120707145023.Extension".

The transmitter/receiver 81 of the data server 80 receives the terminal ID and the screen shot. The storage and reading processing unit 83 creates a folder (or a directory) for each call terminal. In other words, the storage and reading processing unit 83 stores the transmitted screen shot in a dedicated folder having, as a file name, the terminal ID of the transmitting terminal. While the folder name and the terminal ID match in FIG. 22A, they do not have to match as long as the folder and the call terminal are linked. The terminal ID and date information of the call terminal 10 may be held as metadata or tag data of the file, instead of including them in a file name. Moreover, the file name may be given by the data server 80.

The data server 80 may conduct a control such as permitting viewing of the screen shot to only the call terminal which stored the screen shot, permitting viewing of the screen shot for a certain period, etc. For example, the viewing control unit 82 requests a terminal ID and a password to the call terminal, and permits an access when there is a match with a terminal ID and a password that are registered in the terminal authentication management table of the terminal authentication management DB 5002. Then, the storage and reading processing unit 83 restricts a folder accessible by the call terminal 10aa to only a folder with a folder name of "01aa".

Figure 23A:
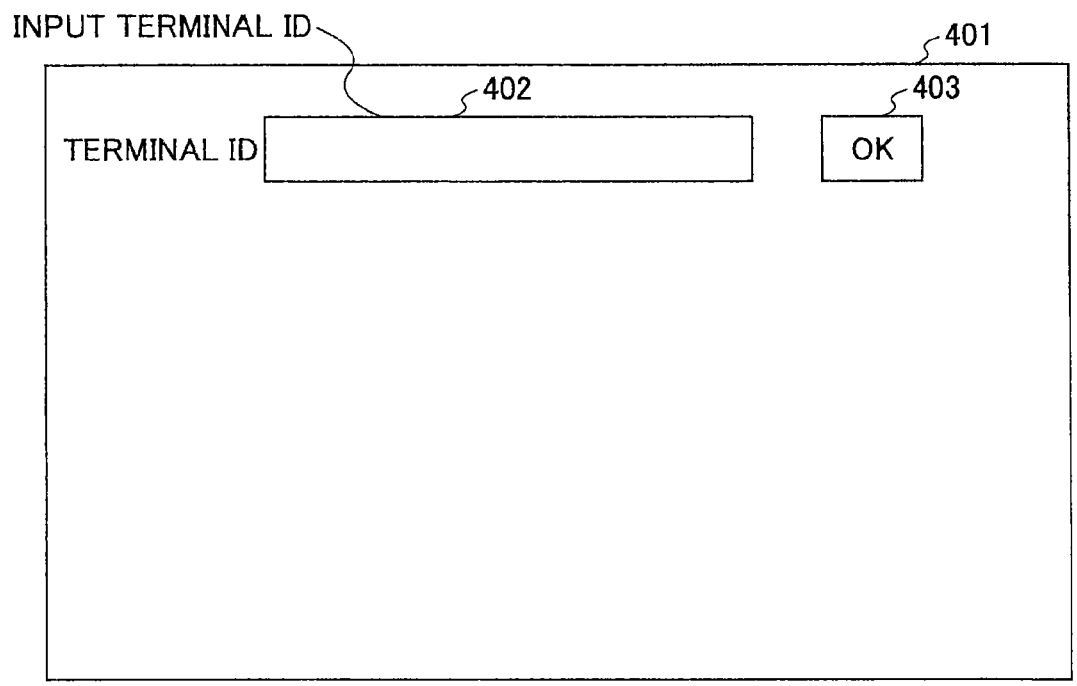
FIGS. 23A and 23B are one example of diagrams for explaining, in the call system, a system configuration when a call terminal 10, etc., views the screen shot.
Figure 23B:
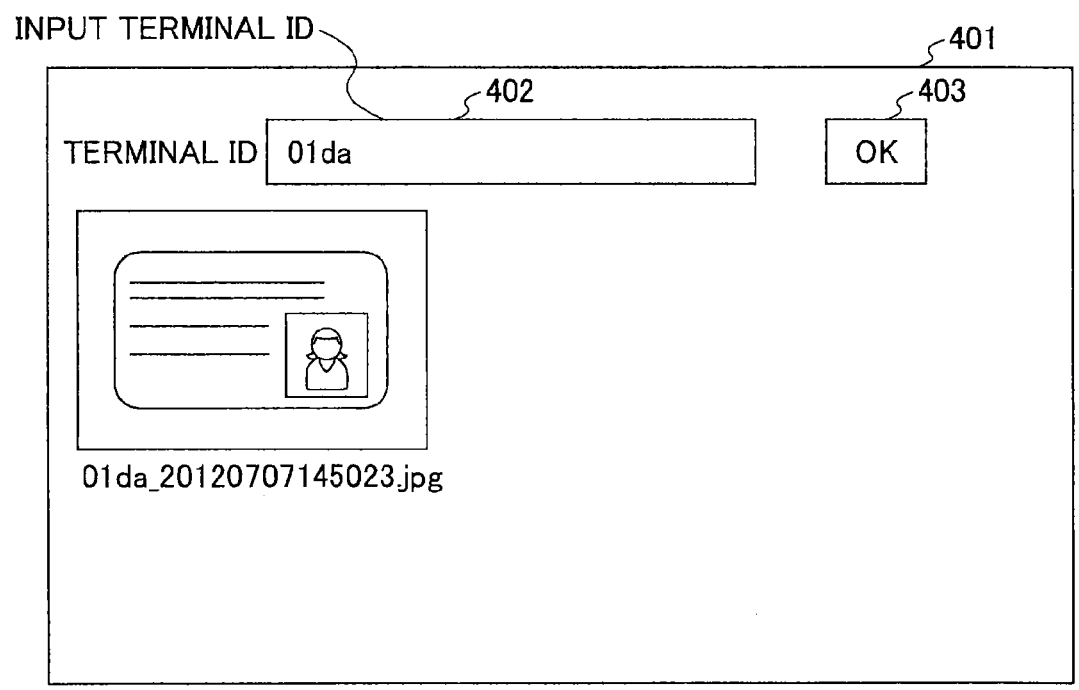

FIGS. 23A and 23B are exemplary diagrams for explaining, in the call system, a system configuration when the call terminal 10, etc., views the screen shot. A viewing unit 18e of the call terminal 10, which is a browser function, for example, accesses a URL "http://photoshot/index", which is designated by the person in charge. A folder accessible by the call terminal 10aa is only a folder with the folder name of 01aa. Such a control may be realized, for example, by the viewing unit 18e of the call terminal 10 transmitting a terminal ID "01aa" and the storage and reading processing unit 83 of the data server 80 searching for the screen shot only from the folder with 01aa as the folder name.

Moreover, when a generic information processing apparatus such as a PC accesses the data server 80, the storage and reading processing unit 83 of the data server 80 restricts a folder which may be accessed, in accordance with the privilege of the person in charge which operates the PC. The person in charge links the user ID, the terminal ID, and the access privilege to register the linked results with the data server 80 in advance. The access privileges may be "general", "administrator", etc.; the person in charge with the general access privilege may only access a folder with a terminal ID which is linked to the user ID. The administrator may access an arbitrary folder, for example.

The data server 80 may encrypt a screen shot of each folder with a key generated from a folder name (a terminal ID). In this way, even when the data server 80 is intruded from outside, it may be arranged to make it difficult for the personal verification document to be leaked since the terminal ID differs for each folder. Moreover, even when the terminal ID is specified, the data may not be decrypted unless a method of generating a key is known; therefore, it may be arranged to make it even more difficult for it to be leaked.

FIG. 23A is a diagram illustrating an exemplary screen displayed on the display 120 of the call terminal or a display 508 of a PC. Here, the call terminal 10aa is to request for viewing to the data server 80. The viewing control unit 82 transmits the terminal ID input screen 401 to the call terminal 10aa accessed. A terminal ID input column 402 is arranged in the terminal ID input screen 401. The person in charge inputs an arbitrary terminal ID.

After the person in charge inputs the terminal ID, upon pressing the OK button 403, the viewing unit 18*e* transmits the input terminal ID and a terminal ID of 01aa (a user ID to be transmitted for a PC) to the data server 80. The storage and reading processing unit 83 of the data server 80 first specifies a folder called 01aa, and searches for a screen shot having the input terminal ID as a file name from the folder. The transmitting/receiving unit 81 of the data server 80 transmits a screen shot meeting the search to the call terminal 10*aa*.

FIG. 23B is a diagram illustrating one example of a screen shot displayed on the display 120. As "01da" is set in the terminal ID input screen 401, the screen shot with the file name including "01da" is displayed out of the screen shots registered from the call terminal 10*aa* as a person in charge. The screen shot is displayed in a thumbnail or in a reduced size in order to increase readability.

In this way, the call terminal 10 which may view the screen shot is restricted to a call terminal with which the screen shot is registered, making it easier to maintain the confidentiality of the personal verification document. The browser 18*e* can designate a screen shot to be viewed in further detail from a file name of a screen shot.

When the terminal ID is delimited with specific symbols (a space, for example) and multiple terminal IDs are input, a screen shot including the terminal ID of multiple call terminals is displayed.

When the date (2012 Jan. 1, for example) is input, a screen shot created on the designated date is displayed. Alternatively, a period is designated, so that the screen shot applying to the period is displayed.

A combination of the terminal ID and the date is input to display a screen shot which meets an AND condition or an OR condition.

Moreover, when the OK button is pressed without inputting the terminal, all screen shots in the folder called 01aa are displayed.

Figures 24, 25:
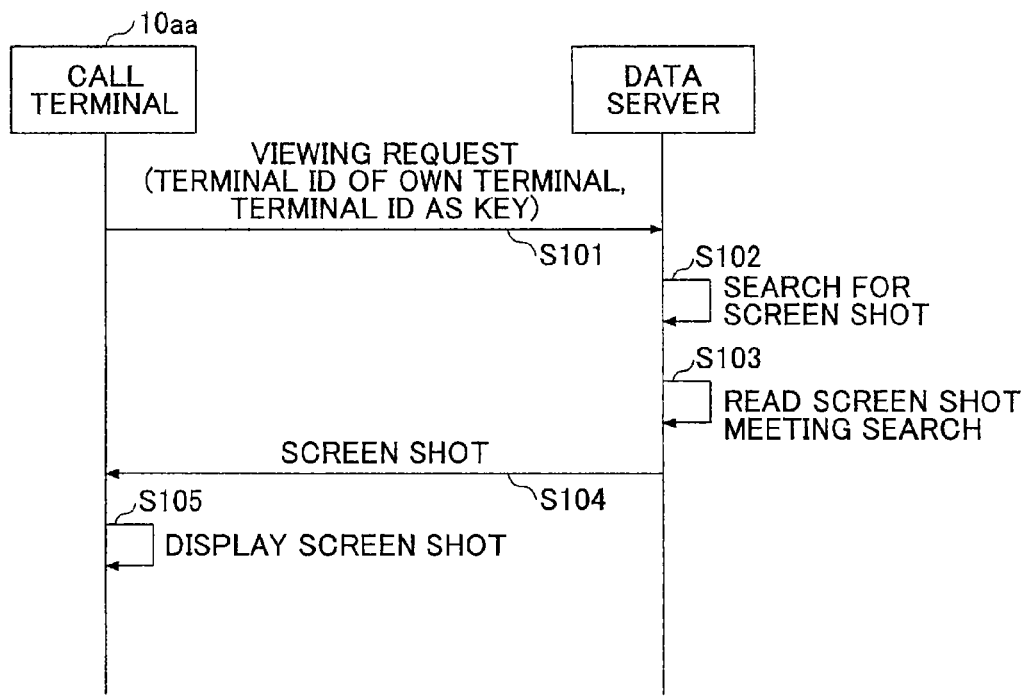
FIG. 24 is an exemplary sequence diagram illustrating a procedure for the call terminal to view the screen shot registered with the data server.
FIG. 25 is a diagram illustrating one example of destination list information.

FIG. 24 is an exemplary sequence diagram illustrating a procedure for the call terminal to view the screen shot registered in the data server 80.

S101: The call terminal 10*aa* transmits, to the data server 80, an input terminal ID to be a search key and a terminal ID of an own terminal, together with a request for search.

S102: The storage and reading processing unit 83 of the data server 80 searches for a screen shot having a file name including the input terminal ID to be the search key from the folder having the terminal ID as the folder name.

S103: The storage and reading processing unit 83 reads a screen shot meeting the search from the folder.

S104: The transmitting/receiving unit 81 of the data server 80 transmits a screen shot to the call terminal 10*aa*.

S105: The transmitting/receiving unit 11 of the call terminal 10*aa* receives a screen shot, which is displayed on the display 120 by the browsing unit 18*e*.

In this way, as a call terminal which can download a screen shot is only a call terminal which registered a screen shot, viewing of the screen shot transmitted by a different call terminal may be prevented.

Printing Procedure

When the person in charge presses "the print" button in the process selection screen in FIG. 20, the call terminal 10 prints the screen shot by the printing terminal 20.

FIG. 20 shows one example of a printer list screen which is displayed when the person in charge presses "a print" button in the process selection screen. In FIG. 20, a message called "please select output destination"; and a list of two printers. Creation of the list of printers as in FIG. 20 is performed by a destination list creation unit 18*a*. The destination list creation unit 18*a* stores destination list information 1003 in the storage unit 1000 from the call management system at login time and thereafter.

FIG. 25 is a diagram illustrating one example of the destination list information 1003. The destination list information 1003 includes a terminal ID, a type, a terminal name, an operating status, and an IP address. These information sets are managed in a terminal status management table of the call management system 50. The destination list creation unit 18*a* creates the destination list information 1003 by obtaining, from the call management system, the terminal ID, the type, the terminal name, the operating status, and the IP address for one having the type as the printing terminal out of destination terminal IDs registered in the destination terminal IDs of the terminal status management table. The destination list creation unit 18*a*, for example, periodically requests a terminal status management table to the call management system 50, and updates the destination list information 1003, as needed.

The display control unit 16 displays, on the display 120, a printer list screen which provides a popup-type display with at least terminal names read from the respective records of the destination list information 1003. The type, operating status, and the IP address may be displayed with the terminal name.

Figure 26:
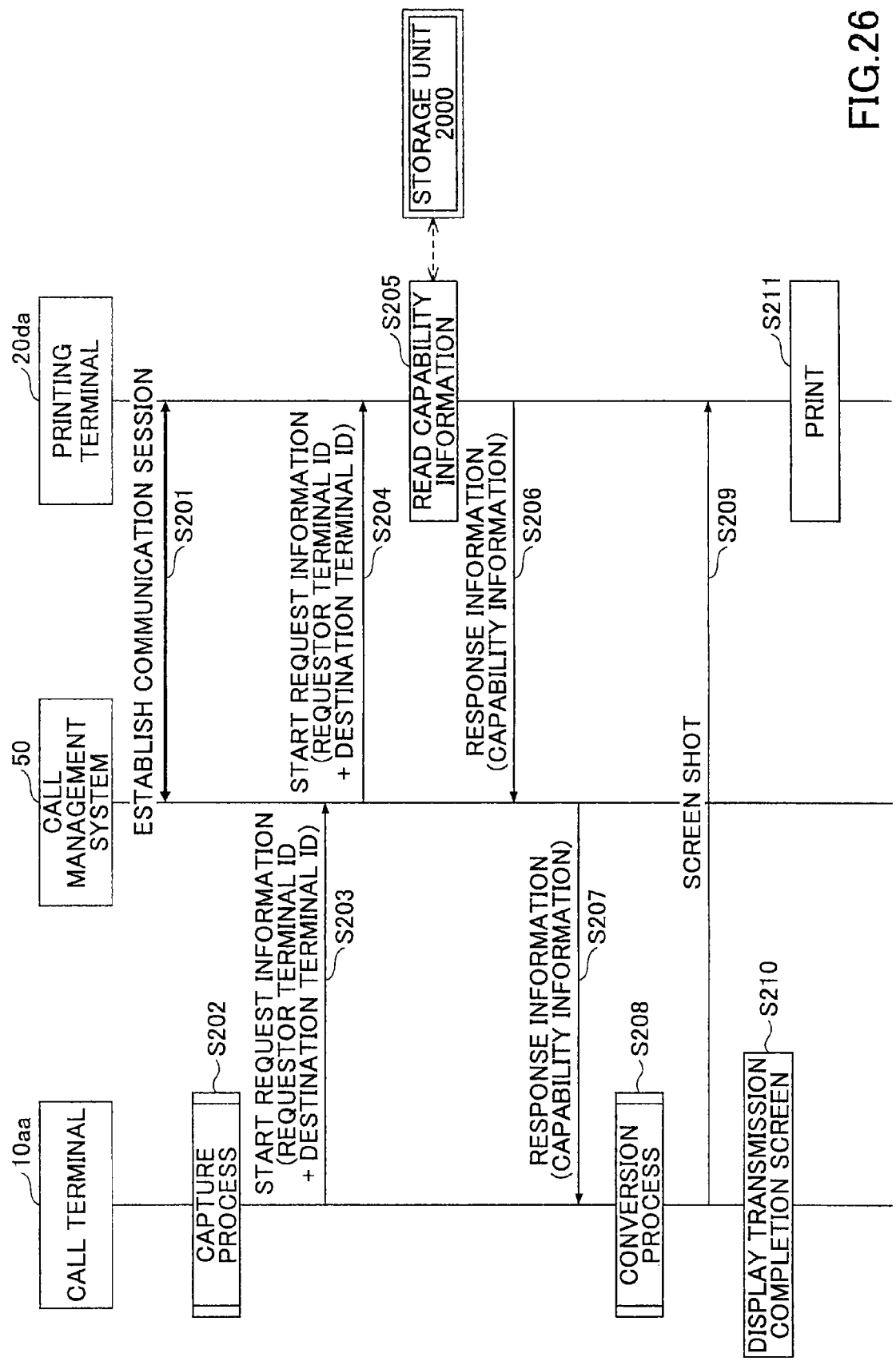
FIG. 26 is an exemplary sequence drawing illustrating a process of transmitting data between the call terminal and the printing terminal.

FIG. 26 is an exemplary sequence drawing illustrating a process of transmitting data between the call terminal and the printing terminal.

S201: The call management system 50 establishes, in advance, a communication session between the printing terminals 20*aa* and 20*da*. This communication session is used for obtaining the operating status, etc. After step S201, login request information is transmitted from the printing terminal 20 to the call management system 50.

S202: The call terminal 10*aa* performs a capture process as described in Embodiment 1. Moreover, the "print" button is pressed in a process selection screen in FIG. 20, and an arbitrary printer is selected from a printer list in FIG. 20. Here, it is assumed that the printing terminal 20*da* is selected.

S203: The transmitter/receiver 11 of the call terminal 10*aa* transmits start request information to the call management system 50. This start request information, which is information indicating that communication is to be started, includes a terminal ID "02da" of the destination terminal (the printing terminal 20*da*) and a terminal ID "01aa" of the call terminal 10*aa*. In this way, the transmitting/receiving unit 51 of the call management system 50 receives start request information.

S204: Next, the transmitting/receiving unit 51 of the call management system 50 transmits start request information to the printing terminal 20*da*. In this way, the transmitting/receiving unit 21 of the printing terminal 20*da* receives start request information.

S205: The storage and reading processing unit 29 of the printer 20*da* reads capability information from the storage unit 2000.

S206: The transmitting/receiving unit 21 transmits response information indicating a response to the start requesting information to the call management system 50. This response information includes capability information. In this way, the transmitting/receiving unit 51 of the call management system 50 receives start response information.

S207: Next, the transmitting/receiving unit 51 of the call management system 50 transmits response information to the call terminal 10*aa*. In this way, the transmitting/receiving unit 11 of the call terminal 10 receives response information.

S208: Next, the call terminal 10*aa* performs a conversion process of image data to be transmitted to the printing terminal 20*da* is performed.

Figure 27:
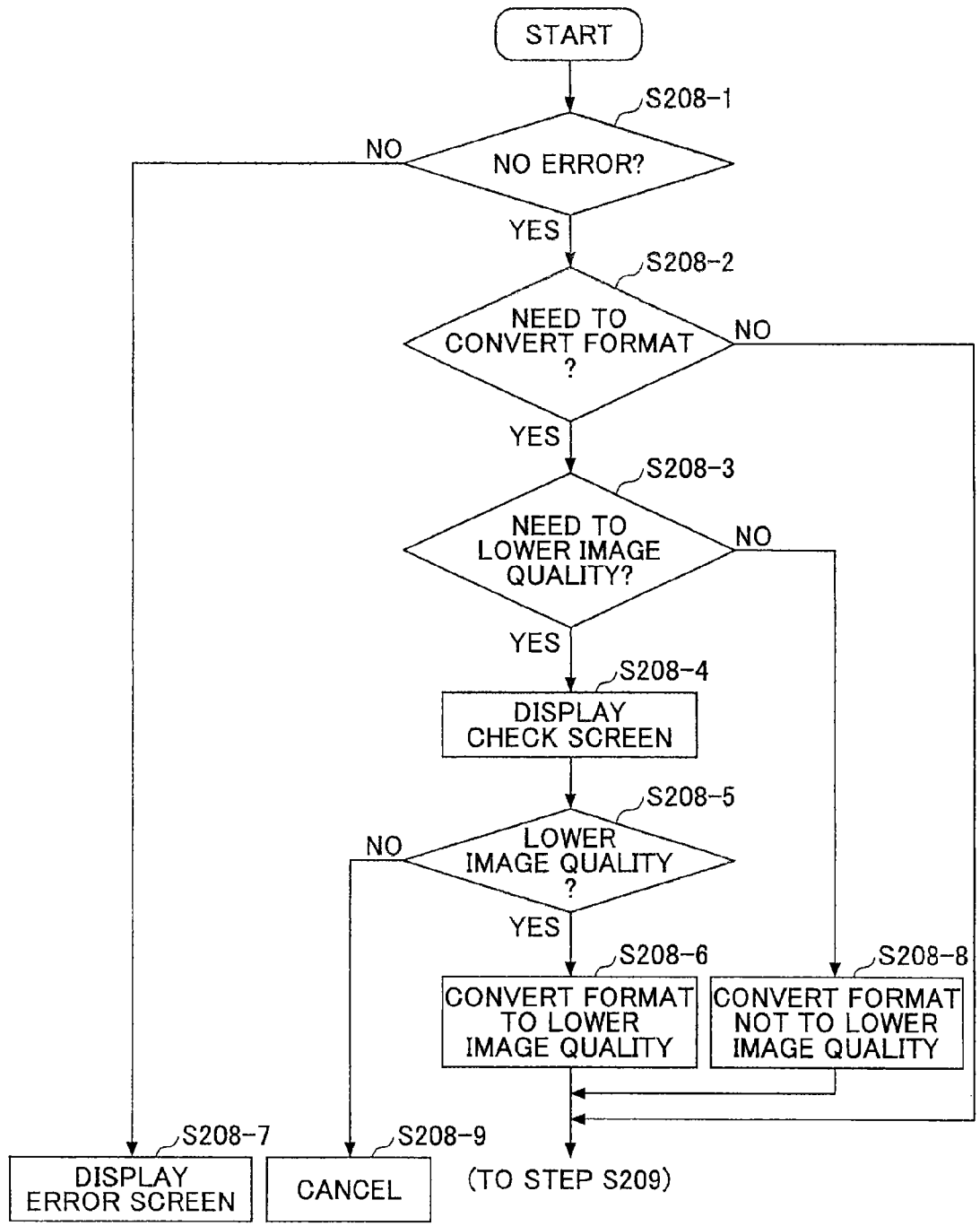
FIG. 27 is an exemplary flowchart illustrating a procedure of a conversion process.

Using FIG. 27, the conversion process is described in detail. FIG. 27 is an exemplary flowchart illustrating a procedure of a conversion process.

First, the determination unit 17*a* determines whether there are no errors based on capability information (Step S208-1). More specifically, when image data (a screen shot) to be transmitted from an own terminal (the call terminal 10*aa*) can be printed by the printing terminal 20, it is determined that there are no errors, and, when it cannot be printed, it is determined that there is an error.

When it is determined that there are no errors (YES), the determination unit 17*a* compares a format of a screen shot at the time it was captured and a format of image data which is printable by the printing terminal 20*da* as indicated in response information, and determines whether there is a need to convert a format of a screen shot to be transmitted (step S208-2).

Then, when there is a need to convert, the determination unit 17*a* further determines whether there is a need to lower the image quality of the screen shot at the time it was captured in line with the image quality of the image data which can be printed by the printing terminal 20*da* as indicated by the response information (step S208-3). For example, when only monochrome printing is possible by the printing terminal 20*da* despite the fact that the captured screen shot is 24-bit color image data, it is determined that there is a need to lower the image quality.

Next, when it is determined that there is a need to lower the image quality in step S208-3 (YES), the display control 16 causes the display 120 to display a check screen (not shown) as a popup-type screen (step S208-4). In this way, a message "Is it OK to print as a black and white image?" is displayed, for example.

Next, when continuation to print in a lowered image quality is accepted by the operation input acceptance unit (YES in step S208-5), the conversion unit 17*b* makes a conversion so as to align with the printing terminal 20*da* by lowering the image quality of the screen shot at the time of capturing such as to align with the format of the image data which can be printed by the printing terminal 20*da* indicated in the response information (step 208-6).

Moreover, the conversion unit 17*b* performs a conversion process in which at least the terminal ID of the own terminal (call terminal 10*aa*) and the printing date/time are overlapped to the screen shot. The terminal ID of the own location is stored in the storage unit 1000, while the printing date/time are read from a clock. In this way, the printing terminal and the printing date/time may be specified in the printed screen shot.

Moreover, it is preferable to include an employee ID of a person in charge who operates the own terminal (call terminal 10*aa*). The employee ID of the person in charge is input by the person in charge into the call terminal 10 and stored in the storage apparatus 1000. In this way, in the printed screen shot, the call terminal 10*aa* may be operated to specify the person in charge of printing. Moreover, the customer ID may further be printed. The customer ID is input to the call terminal by the person in charge or the customer to include the input results in a file name, etc. In this way, the customer ID of the customer who appears in the screen shot may be specified.

On the other hand, when it is determined in step S208-1 that it is not without an error (that there is an error), the display control unit 16 displays, on a display 120, an error screen (not shown) as a popup-type screen. For example, a message that "printing could not be completed since the present terminal fails to support the image format" is displayed.

Moreover, when it is determined that the format conversion is not necessary (NO) in step S208-2, the process of steps S208-3 to S208-6 is omitted, so that the process proceeds to the below-described step S209.

Moreover, in the above-described step S208-3, when it is determined that there is no need to lower the video quality (NO), the image quality is not lowered and only the format conversion is performed (step S208-8), proceeding to the below-described step S209.

Furthermore, when it is determined in step S208-5 that the image quality is not lowered (NO), data transmission to the printing terminal 20 is cancelled (step S208-9).

S209: Returning to FIG. 26, the transmitting/receiving unit 11 of the call terminal 10*aa* transmits the screen shot to the destination terminal (printing terminal 20*da*) with an IP address of the destination list information 1003 as a destination, without passing through the call management system 50 and the relaying apparatus 30*a*.

S210: The display control 16 displays a transmission completion screen P70 as a popup screen to the display 120. For example, a message that "transmitted to the printing terminal" is displayed.

S211: In the printing terminal 20*da*, the printing unit 22 prints a screen shot sent from step S209 onto a sheet of paper. In this way, the image data captured in the call terminal 10*aa* is printed and output onto the sheet of paper in the printing terminal 20*da*.

Figure 28:
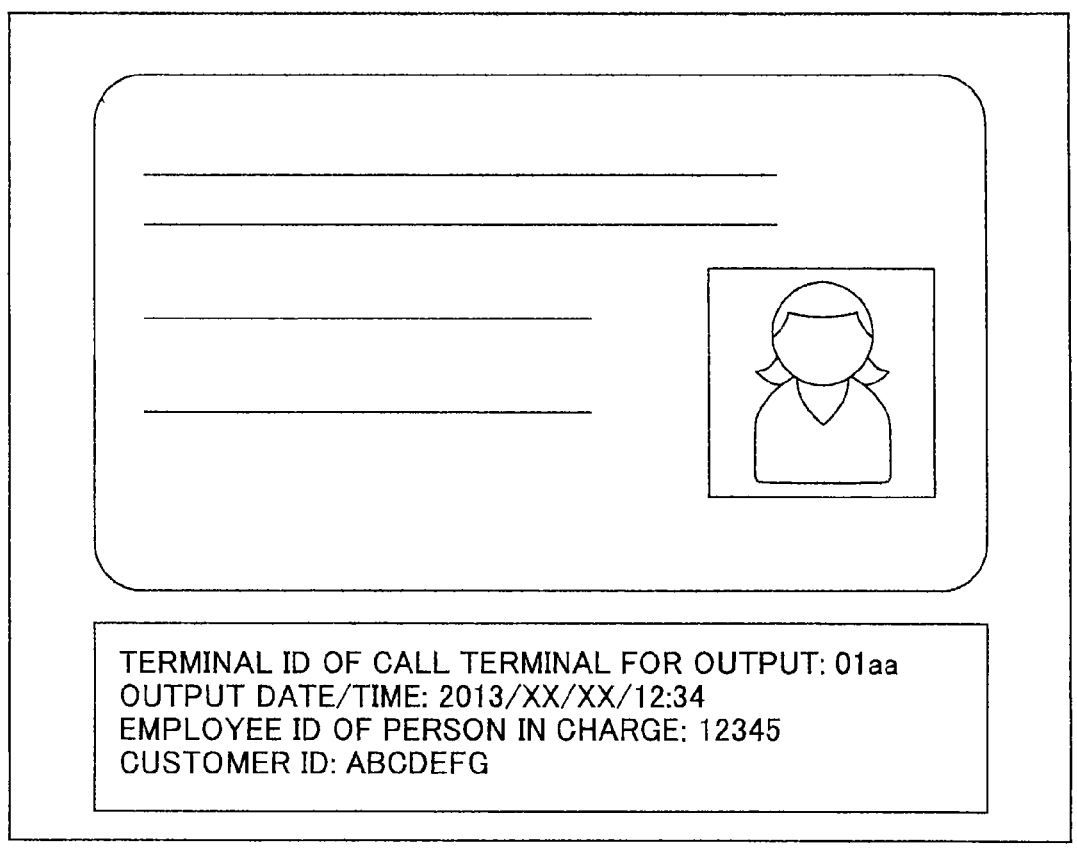
FIG. 28 is a diagram illustrating one example of a screen shot printed on a sheet.

FIG. 28 is a diagram illustrating one example of a screen shot printed on a sheet. On the lower portion of the screen shot of the personal verification document is printed the terminal ID of the call terminal for output, an output date/time, an employee ID of a person in charge, a customer ID. This makes it possible to specify the leakage route when this sheet is leaked.

In this way, the call system of the present Embodiment makes it possible to perform registration to a data server and print a screen shot from an arbitrary printing terminal registered.

According to a further Embodiment of the present invention, a communication system is provided, wherein multiple communication terminals communicate via a communication network, comprising:

an imaging unit which images image data;

a display control unit which displays, on a display unit, image data imaged by a different communication network; and an image data storage unit which stores the image data displayed on the display unit when information indicating that storage is permitted from the different communication network is obtained.

According to a yet further Embodiment of the present invention, a communication system is provided, comprising: a program which causes a communication terminal which communicates with a different communication terminal via a network to execute the steps of: displaying image data imaged by the different communication terminal on a display unit; and storing the image data displayed on the display unit in a capture storage unit when information indicating a permission to store is received from the different communication terminal.

According to a still further Embodiment of the present invention, an information processing apparatus which communicates via a communication network with a second communication terminal which images image data and a first communication terminal which stores the image data, wherein information indicating a permission to store the image data received from the second communication terminal is transferred to the first communication terminal which receives the image data imaged by the second communication terminal to display the received results on a display unit.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Application No. 2013-132482 filed on Jun. 25, 2013, the entire contents of which is hereby incorporated by reference.

The invention claimed is:

1. A communication terminal which communicates with a different communication terminal via a communication network, the communication terminal comprising:
a display interface circuit which displays, on a display, image data imaged by the different communication terminal; and
processing circuitry configured to receive, from the different communication terminal, information indicating permission to store the image data, and store the displayed image data in a capture memory when the information indicating the permission to store the image data is received from the different communication terminal, wherein the processing circuitry is further configured to make a request, to the different communication terminal, for the permission to store the image data,
obtain the information indicating the permission to store the image data from the different communication terminal as a response to the request for the permission to store the image data,
store the displayed image data in the capture memory, even when an operation of storing the image data to the communication terminal is not accepted, and
transition the communication terminal to an operation mode in which the image data is stored, wherein
when transitioned to the operation mode, the processing circuitry reports to the different communication terminal of transitioning to the operation mode to transition the different communication terminal to an imaging mode in which all operations are not accepted, other than a permission operation, and
when the processing circuitry accepts a completion of the operation mode, the processing circuitry transitions the different communication terminal from the imaging mode to a normal mode in which an operation is accepted, other than a permission operation.

2. The communication terminal as claimed in claim 1, wherein, when transitioned to the operation mode, the display interface circuit of the communication terminal displays the image data in a full size on the display; and
a display controller of the different communication terminal transitioned to the imaging mode displays the image data on a different display connected to the different communication terminal in a full size on the different display.

3. The communication terminal as claimed in claim 1, wherein, from a time when the processing circuitry requests the permission to store the image data to a time when information indicating the permission to store is received by the processing circuitry, the display interface circuit applies image processing to the image data to make content of the image data difficult to read, and displays the applied results on the display.

4. The communication terminal as claim in claim 1, further comprising:
a transmitter that transmits the image data stored by the processing circuitry to an information processing apparatus, which is connected via a communication network, wherein
the transmitter transmits, to the information processing apparatus, information identifying the communication terminal, to cause the information processing apparatus to store the image data in a memory in association with the information identifying the communication terminal; and
the image data transmitted to the information processing apparatus is deleted from the capture memory.

5. The communication terminal as claimed in claim 3, wherein the processing circuitry transmits, to the information processing apparatus, information identifying the communication terminal, to request the image data stored in the memory in association with the information identifying the communication terminal, and displays the received image data on the display.

6. The communication terminal as claimed in claim 1, wherein the display interface circuit displays the image data, which includes an image in which a confidential document is imaged.

7. The communication terminal as claimed in claim 6, wherein the display interface circuit displays the image data, which includes the image in which the confidential document is imaged, wherein the confidential document is a personal verification document including personal information.

8. A communication system, comprising:
a first communication terminal; and
a second communication terminal communicating with the first communication terminal via a communication network,
wherein the second communication terminal includes a camera which images image data, and
the first communication terminal includes
a display interface circuit which displays the image data imaged by the second communication terminal on a display; and
first processing circuitry configured to receive, from the second communication terminal, information indicating permission to store the image data, and store the displayed image data in a capture memory, when the information indicating the permission to store the image data is obtained from the second communication terminal, wherein the first processing circuitry is further configured to
make a request, to the different communication terminal, for the permission to store the image data,
obtain the information indicating the permission to store the image data from the different communication terminal as a response to the request for the permission to store the image data,
store the displayed image data in the capture memory, even when an operation of storing the image data to the communication terminal is not accepted, and
transition the communication terminal to an operation mode in which the image data is stored, wherein
when transitioned to the operation mode, the first processing circuitry reports to the different communication terminal of transitioning to the operation mode to transition the different communication terminal to an imaging mode in which all operations are not accepted, other than a permission operation, and
when the first processing circuitry accepts a completion of the operation mode, the first processing circuitry transitions the different communication terminal from the imaging mode to a normal mode in which an operation is accepted, other than a permission operation.

9. The communication system as claimed in claim 8, wherein the second communication terminal includes
second processing circuitry which accepts the permission to store the image data; and
a transmitter which transmits information indicating the permission to store to the first communication terminal, when the second processing circuitry accepts the permission to store.

10. A communication method in a communication terminal which communicates with a different terminal via a communication network, the method comprising:
displaying image data imaged by the different communication terminal on a display;
receiving, from the different communication terminal, information indicating permission to store the image data; and
storing the displayed image data in a capture memory, when the information indicating the permission to store the image data is received from the different communication terminal, wherein the method further comprises
making a request, to the different communication terminal, for the permission to store the image data,
obtaining the information indicating the permission to store the image data from the different communication terminal as a response to the request for the permission to store the image data, and
storing the displayed image data in the capture memory, even when an operation of storing the image data to the communication terminal is not accepted,
wherein the communication terminal is configured to transition to an operation mode in which the image data is stored,
when transitioned to the operation mode, the communication terminal reports to the different communication terminal of transitioning to the operation mode to transition the different communication terminal to an imaging mode in which all operations are not accepted, other than a permission operation, and
when the communication terminal accepts a completion of the operation mode, the communication terminal transitions the different communication terminal from the imaging mode to a normal mode in which an operation is accepted, other than a permission operation.

* * * * *